(12) United States Patent
Archer et al.

(10) Patent No.: US 12,484,125 B2
(45) Date of Patent: Nov. 25, 2025

(54) INTEGRATED LIGHT ENGINE HAVING A LOW-POWER STANDBY MODE

(71) Applicant: ERP POWER, LLC, Moorpark, CA (US)

(72) Inventors: Michael Archer, Moorpark, CA (US); Louis Chen, Simi Valley, CA (US); James H. Mohan, Valencia, CA (US); Steven C. Krattiger, Northridge, CA (US); Erik Morales, Los Angeles, CA (US); Vachik Javadian, Glendale, CA (US); Yuko Nakazawa, Santa Cruz, CA (US)

(73) Assignee: ERP POWER, LLC, Westlake Village, CA (US)

( * ) Notice: Subject to any disclaimer, the term of this patent is extended or adjusted under 35 U.S.C. 154(b) by 67 days.

(21) Appl. No.: 18/623,845

(22) Filed: Apr. 1, 2024

(65) Prior Publication Data

US 2024/0334566 A1  Oct. 3, 2024

Related U.S. Application Data

(60) Provisional application No. 63/493,281, filed on Mar. 30, 2023.

(51) Int. Cl.
*H05B 45/355* (2020.01)
*H05B 45/10* (2020.01)
*H05B 45/3725* (2020.01)
*H05B 45/50* (2022.01)

(52) U.S. Cl.
CPC .......... *H05B 45/355* (2020.01); *H05B 45/50* (2020.01)

(58) Field of Classification Search
None
See application file for complete search history.

(56) References Cited

U.S. PATENT DOCUMENTS

| | | | | |
|---|---|---|---|---|
| 2008/0278086 A1* | 11/2008 | Chitta | .................... | H05B 45/38 |
| | | | | 315/307 |
| 2014/0009080 A1* | 1/2014 | Xu | ..................... | H05B 45/3725 |
| | | | | 315/224 |
| 2023/0189409 A1* | 6/2023 | Xiong | .................... | H05B 45/31 |
| | | | | 315/294 |

\* cited by examiner

*Primary Examiner* — Anh Q Tran
(74) *Attorney, Agent, or Firm* — Womble Bond Dickinson (US) LLP

(57) ABSTRACT

A lighting system includes a converter configured to receive a rectified input voltage and to generate an output voltage based on a gate control signal; a PFC controller including a zero-crossing input, and configured to generate the gate control signal to adjust the output voltage of the converter based on a zero-crossing voltage at the zero-crossing input; a zero-crossing delay circuit coupled between an output of the converter and the zero-crossing input, and configured to slow a rate of change of the zero-crossing voltage based on one or more delay control signals; and a channel controller configured to identify a low-load state of the lighting system, and, in response, to generate the one or more delay control signals.

20 Claims, 21 Drawing Sheets

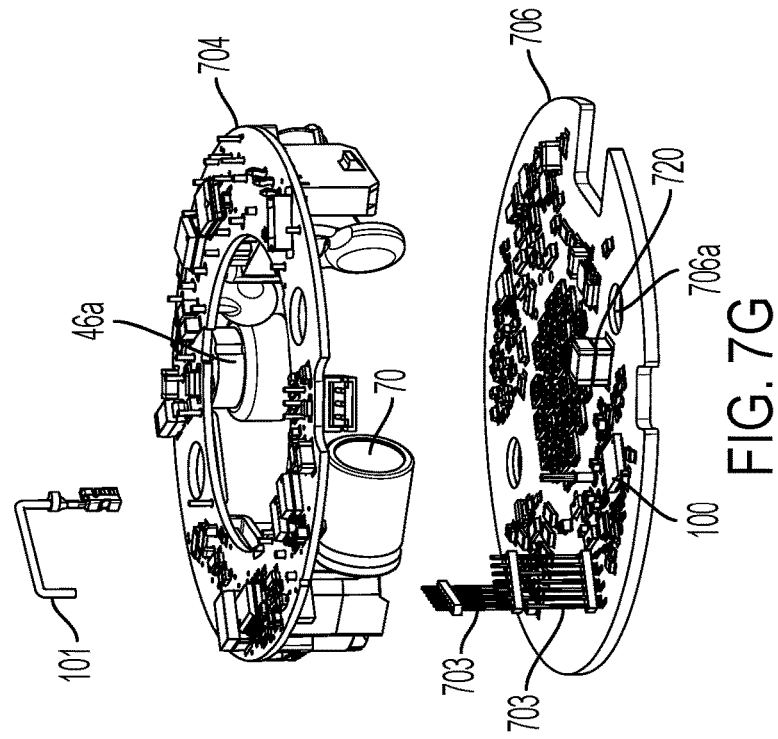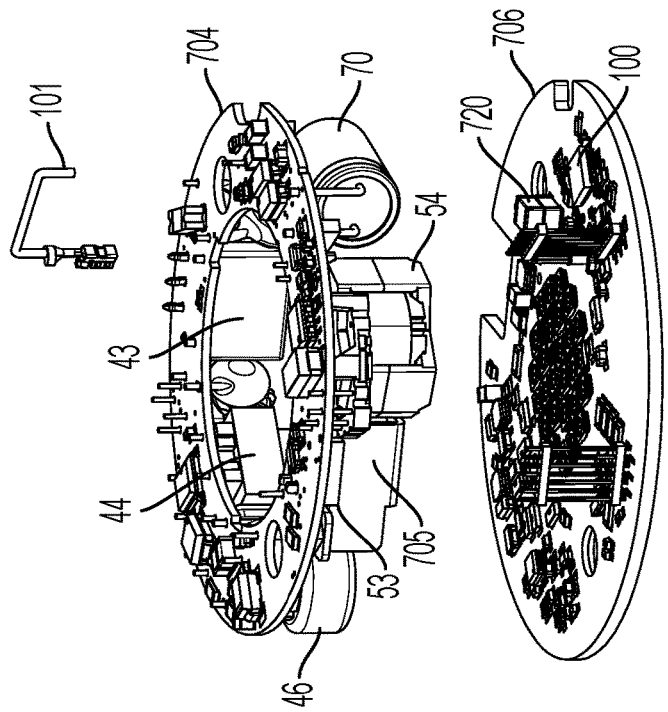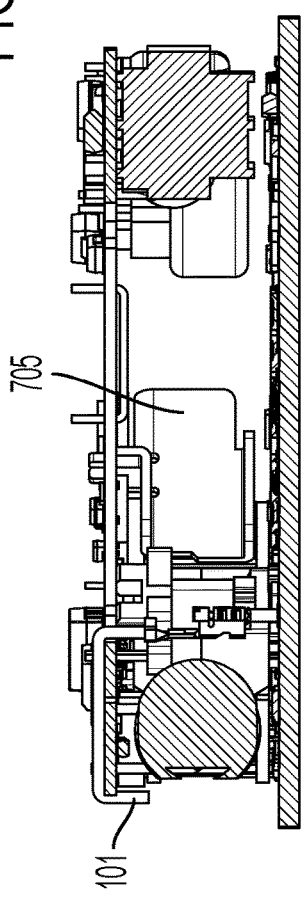

INTEGRATED LIGHT ENGINE HAVING A LOW-POWER STANDBY MODE

CROSS-REFERENCE TO RELATED APPLICATION(S)

This application claims priority to, and the benefit of, U.S. Provisional Application No. 63/493,281 ("INTEGRATED LIGHT ENGINE HAVING A LOW-POWER STANDBY MODE"), filed on Mar. 30, 2023.

This application is also related to U.S. patent application Ser. No. 18/599,038 ("LIGHTING SYSTEM WITH INTEGRATED POWER SUPPLY AND LIGHT SOURCE"), filed on Mar. 7, 2024, which claims priority to, and the benefit of, U.S. Provisional Application No. 63/488,972 ("LIGHTING SYSTEM WITH INTEGRATED POWER SUPPLY AND LIGHT SOURCES"), filed on Mar. 7, 2023; U.S. Provisional Application No. 63/490,630 ("VERTICALLY-STACKED COMPACT INTEGRATED LIGHT ENGINE"), filed on Mar. 16, 2023; U.S. Provisional Application No. 63/490,638 ("INTEGRATED LIGHT ENGINE HAVING A CONDUCTIVE SUBSTRATE AND IMPROVED NOISE PERFORMANCE"), filed on Mar. 16, 2023; U.S. Provisional Application No. 63/490,640 ("INTEGRATED LIGHT ENGINE HAVING A CONDUCTIVE SUBSTRATE AND IMPROVED HEAT TRANSFER"), filed on Mar. 16, 2023; U.S. Provisional Application No. 63/490,646 ("INTEGRATED LIGHT ENGINE HAVING A PEDESTAL HEATSINK AND IMPROVED HEAT TRANSFER"), filed on Mar. 16, 2023; U.S. Provisional Application No. 63/490,650 ("INTEGRATED LIGHT ENGINE HAVING A PEDESTAL HEATSINK AND IMPROVED NOISE PERFORMANCE"), filed on Mar. 16, 2023; U.S. Provisional Application No. 63/490,740 ("INTEGRATED LIGHT ENGINE WITH IMPROVED TRIAC LOADING AND WIDE INPUT VOLTAGE RANGE"), filed on Mar. 16, 2023; U.S. Provisional Application No. 63/492,940 ("INTEGRATED LIGHT ENGINE INCLUDING A FAST, LOW-POWER STARTUP CIRCUIT"), filed on Mar. 29, 2023; U.S. Provisional Application No. 63/493,281 ("INTEGRATED LIGHT ENGINE HAVING A LOW-POWER STANDBY MODE"), filed on Mar. 30, 2023; U.S. Provisional Application No. 63/589,948 ("COMPACT LIGHT ENGINE WITH WIDE AC INPUT RANGE AND TUNABLE COLOR AND INTENSITY"), filed on Oct. 12, 2023; and U.S. Provisional Application No. 63/619,264 ("COMPACT LIGHT ENGINE WITH INTEGRATED LED ARRAY"), filed on Jan. 9, 2024, the entire contents of which are incorporated herein by reference.

FIELD

Aspects of the present invention are related to light drivers.

BACKGROUND

A light fixture may include a string of light sources, such as light emitting diodes (LEDs), that convert electrical energy (commonly in the form of electrical current) into light. The light intensity of the light sources is primarily based on the magnitude of the driving current, which is produced by a light driver. The light driver generally includes a PFC controller that is coupled to a diode bridge rectifier at the input of the light driver and ensures that the input current is in phase with the full-wave-rectified line input voltage. The PFC controller may also be used to adjust the switching frequency, duty cycle, on-time, etc., of a DC-DC converter of the light driver.

The above information disclosed in this Background section is only for enhancement of understanding of the invention, and therefore it may contain information that does not form the prior art that is already known to a person of ordinary skill in the art.

SUMMARY

Aspects of embodiments of the present invention are directed to a lighting system utilizing a zero-crossing delay circuit to control the off-time of a power-factor-correction (PFC) controller to improve the output operating range, while still remaining within EMC (electromagnetic compliance) limits for power factor and total harmonic distortion.

According to some embodiments of the present disclosure, there is provided a lighting system including: a converter configured to receive a rectified input voltage and to generate an output voltage based on a gate control signal; a PFC controller including a zero-crossing input, and configured to generate the gate control signal to adjust the output voltage of the converter based on a zero-crossing voltage at the zero-crossing input; a zero-crossing delay circuit coupled between an output of the converter and the zero-crossing input, and configured to slow a rate of change of the zero-crossing voltage based on one or more delay control signals; and a channel controller configured to identify a low-load state of the lighting system, and, in response, to generate the one or more delay control signals.

In some embodiments, the low-load state includes a stand-by state of the lighting system.

In some embodiments, the channel controller is configured to detect a load current of the converter and to identify the low-load state of the lighting system based on the load current being below a current threshold.

In some embodiments, the channel controller is configured to identify the low-load state of the lighting system based on a dimmer level set by an external dimmer.

In some embodiments, in response to the zero-crossing voltage being above a zero-crossing threshold, the PFC controller is configured to generate the gate control signal to repeatedly turn on and off a driving switch of the converter until the output voltage reaches a desired level; and, in response to the zero-crossing voltage being less than or equal to the zero-crossing threshold, the PFC controller is configured to deactivate the driving switch of the converter to allow the output voltage to drop.

In some embodiments, the zero-crossing delay circuit is configured to prolong an off-time of driving switch in response to the one or more delay control signals from the channel controller.

In some embodiments, the zero-crossing delay circuit includes: a resistor coupled between the output of the converter and the zero-crossing input; a first switchable delay circuit switchably coupled between the zero-crossing input and a reference ground, and configured to delay change in the zero-crossing voltage in response to a first delay control signal of the one or more delay control signals.

In some embodiments, the first switchable delay circuit includes: a first capacitor and a first switch coupled together in series between the zero-crossing input and the reference ground.

In some embodiments, the first switch includes a first gate electrode communicatively coupled to the channel controller, the first switch being configured to activate and capacitively couple the zero-crossing input to the reference ground via the first capacitor in response to receiving the first delay control signal from the channel controller at the first gate electrode, and the first switch is configured to deactivate and decouple the zero-crossing input from the first capacitor in an absence of the first delay control signal at the first gate electrode.

In some embodiments, a capacitance of the first capacitor is about 47 µF, a resistance of the resistor is about 50 kΩ.

In some embodiments, the zero-crossing delay circuit further includes: a second switchable delay circuit switchably coupled between the zero-crossing input and a reference ground, and configured to delay change in the zero-crossing voltage in response to a second delay control signal of the one or more delay control signals.

In some embodiments, the second switchable delay circuit includes: a second capacitor and a second switch coupled together in series between the zero-crossing input and the reference ground.

In some embodiments, the second switch includes a second gate electrode communicatively coupled to the channel controller, the second switch being configured to activate and capacitively couple the zero-crossing input to the reference ground via the second capacitor in response to receiving the second delay control signal from the channel controller at the second gate electrode, and the second switch is configured to deactivate and decouple the zero-crossing input from the second capacitor in an absence of the second delay control signal at the second gate electrode.

In some embodiments, the lighting system further includes: a rectifier configured to receive an AC input signal and to generate the rectified input voltage; and a light source configured to emit light based on the output voltage of the converter, wherein the converter is a DC-DC converter.

According to some embodiments of the present disclosure, there is provided a method of reducing power consumption in a lighting system, the method including: identifying, by a channel controller of the lighting system, that the lighting system is in a low-load state; and transmitting one or more delay control signals to a zero-crossing delay circuit to capacitively couple a zero-crossing input to the zero-crossing delay circuit, wherein the lighting system includes: a converter configured to receive a rectified input voltage and to generate an output voltage based on a gate control signal; a PFC controller configured to generate the gate control signal to adjust the output voltage of the converter based on a zero-crossing voltage at the zero-crossing input; and the zero-crossing delay circuit that is coupled between an output of the converter and the zero-crossing input, and is configured to slow a rate of change of the zero-crossing voltage based on the one or more delay control signals.

In some embodiments, the channel controller is configured to detect a load current of the converter and to identify the low-load state of the lighting system based on the load current being below a current threshold.

In some embodiments, the channel controller is configured to identify the low-load state of the lighting system based on a dimmer level set by an external dimmer.

In some embodiments, in response to the zero-crossing voltage being above a zero-crossing threshold, the PFC controller is configured to generate the gate control signal to repeatedly turn on and off a driving switch of the converter until the output voltage reaches a desired level, wherein, in response to the zero-crossing voltage being less than or equal to a threshold, the PFC controller is configured to deactivate the driving switch of the converter to allow the output voltage to drop, and wherein the zero-crossing delay circuit is configured to prolong an off-time of driving switch in response to the one or more delay control signals from the channel controller.

In some embodiments, the zero-crossing delay circuit includes: a resistor coupled between the output of the converter and the zero-crossing input; a first switchable delay circuit switchably coupled between the zero-crossing input and a reference ground, and configured to delay change in the zero-crossing voltage in response to a first delay control signal of the one or more delay control signals.

In some embodiments, the first switchable delay circuit includes: a first capacitor and a first switch coupled together in series between the zero-crossing input and the reference ground, wherein the first switch includes a first gate electrode communicatively coupled to the channel controller, the first switch being configured to activate and capacitively couple the zero-crossing input to the reference ground via the first capacitor in response to receiving the first delay control signal from the channel controller at the first gate electrode, and wherein the first switch is configured to deactivate and decouple the zero-crossing input from the first capacitor in an absence of the first delay control signal at the first gate electrode.

BRIEF DESCRIPTION OF THE DRAWINGS

The accompanying drawings, together with the specification, illustrate example embodiments of the present disclosure, and, together with the description, serve to explain the principles of the present disclosure.

FIGS. 7F and 7G illustrate exploded perspective views of two PCB layers of the lighting system on which the internal electrical components are mounted to, according to some embodiments of the present disclosure.

FIG. 7H illustrates a cross-sectional view of the two PCB layers of the lighting system, according to some embodiments of the present disclosure.

DETAILED DESCRIPTION

The detailed description set forth below is intended as a description of example embodiments of a compact, integrated multi-layered lighting system, provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Aspects of some embodiments of the present disclosure are directed to an integrated multi-layered lighting system in a single fixture with wireless capabilities, color temperature mixing, and an integrated light source, which does not sacrifice functionality in favor of space. In some embodiments, this integrated lighting system is multilayered with multiple printed circuit board (PCB) layers that provide additional surface area for mounted components. The resulting lighting system may mimic the color temperature of an ideal black body radiator while being able to fit color channels, a microprocessor, power electronic circuitry, and control circuitry onto a multilayered PCB design that remains compact and is able to fit into existing fixtures. In some examples, the integrated lighting system has a very compact design with a diameter of 61 mm or less and a height of 30 mm or less. The integrated lighting system may operate under a wide input range of about 90 VAC to about 305 VAC at a frequency of about 50-60 Hz. With such input, the integrated lighting system may be capable of delivering up to 5000 lumens at various CCT settings.

According to some embodiments, the compact, multilayer design of the lighting system maximizes the amount of space for installing through-hole components. In some examples, the use of one or more ring PCB boards allows for the color channels to be mounted to the first layer without obstructions from the second or higher layers.

Figure 1:
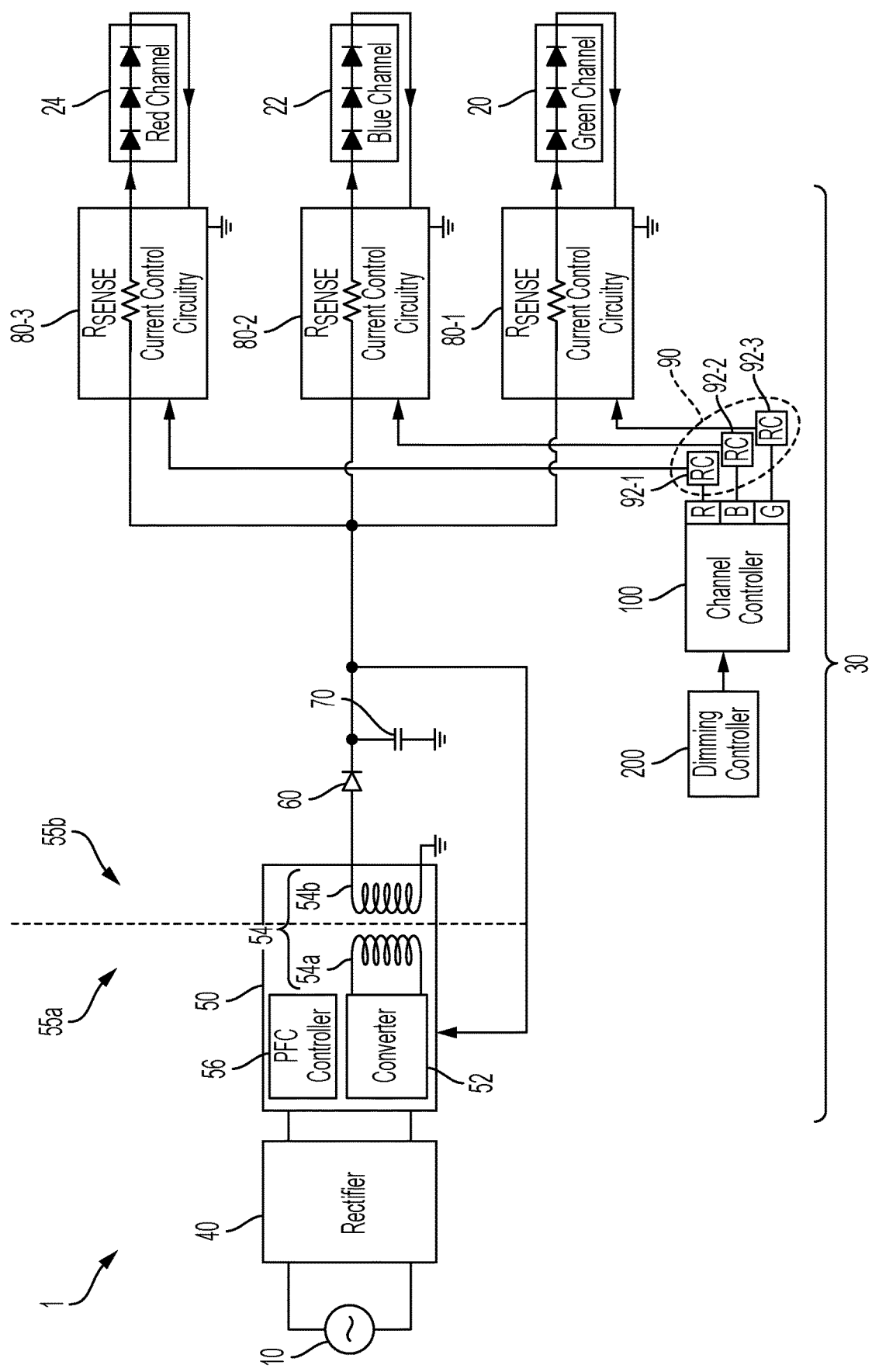
FIG. 1 illustrates a lighting system including a multi-channel light driver, according to some example embodiments of the present disclosure.

FIG. 1 illustrates a lighting system 1 including a multi-channel light driver 30, according to some example embodiments of the present disclosure.

According to some embodiments, the lighting system 1 includes an input source 10, a plurality of color channels (e.g., a plurality of LED channels) 20, 22, and 24, and a multi-channel light driver 30 for powering and controlling the brightness/intensity of the color channels 20, 22, and 24.

The input source 10 may include an alternating current (AC) power source that may operate at a voltage of 100 Vac, a 120 Vac, a 240 Vac, 277 Vac, or higher, for example. The input source 10 may also include a dimmer electrically powered by said AC power sources. The dimmer may modify (e.g., cut/chop a portion of) the input AC signal according to a dimmer level before sending it to the light driver 30, and thus variably reduces the electrical power delivered to the light driver 30 and the color channels 20, 22, and 24. In some examples, the dimmer may be a TRIAC or ELV dimmer, and may chop the front end or leading edge of the AC input signal. According to some examples, the dimmer interface may be a rocker interface, a tap interface, a slide interface, a rotary interface, or the like.

In some embodiments, the plurality of color channels includes a first channel (e.g., a green channel) 20, a second channel (e.g., a blue channel) 22, and a third channel (e.g., a red channel) 24. Each channel may include one or more light-emitting-diodes (LEDs) of the corresponding colors (e.g., red, green, or blue LEDs). While in some embodiments, the first through third color channels 22-24 represent RGB colors, embodiments of the present disclosure are not limited thereto, and the plurality of channels may include any suitable number of color channels. Further, embodiments of the present disclosure are not limited to LEDs, and in some examples, other solid-state lighting devices may be employed.

In some embodiments, the multi-channel light driver 30 includes an input rectifier (e.g., an input rectifier circuit) 40, a power supply (also referred to as a power supply circuit) 50, an output rectifier 60, a filter 70, a plurality of current control circuits 80-1 to 80-3, and a channel controller 100.

The input rectifier 40 may provide a same polarity of output for either polarity of the AC signal from the input source 10. In some examples, the input rectifier 40 may include a full-wave circuit using a center-tapped transformer, a full-wave bridge circuit with four diodes, a halfwave bridge circuit, or a multi-phase rectifier. The input AC signal may be about 90 VAC to about 305 VAC at 50-60 Hz.

The power supply circuit 50 converts the rectified AC signal generated by the input rectifier 40 into a drive signal for powering the plurality of color channels 20, 22, and 24. In some embodiments, the power supply circuit 50 includes a voltage converter 52 for maintaining (or attempting to maintain) a constant DC bus voltage on its output while drawing a current that is in phase with and at the same frequency as the line voltage (by virtue of a PFC controller/circuit 56). A transformer 54 inside the power supply circuit 50 produces the desired output voltage from the DC bus. In some examples, the power supply circuit 50 may include the PFC circuit (or PFC controller) 56 for improving (e.g., increasing) the power factor of the load on the input source 10 and reducing the total harmonic distortions (THD) of the light driver 30.

According to some embodiments, the multi-channel light driver 30 drives the plurality of color channels 20, 22, and 24 to produces light temperatures that follow the blackbody curve. In so doing, the multi-channel light driver 30 may perform color mixing of, for example, red, blue, and green light to achieve the desired light temperature. In some embodiments, the multi-channel light driver 30 determines the color temperature based on a dimmer setting, a time of day, or a combination thereof.

In some embodiments, the driving current of each of the plurality of color channels 20, 22, and 24 may be derived from the same secondary winding 54b of the transformer 54. While the plurality of color channels 20, 22, and 24 are driven by the same winding, the channel current of each color channel is independent of the other color channels. This independent control of the channel currents is enabled by utilizing a separate/different current control circuit 80 for each color channel 20/22/24.

According to some embodiments, the color channels 20, 22, and 24 share a common output rectifier (e.g., diode) 60 and filter (e.g., capacitor) 70, which convert the AC driving signal output by the secondary winding 54a of the transformer 54 into a DC channel current for driving the color channels 20, 22, and 24. The anode of the output rectifier 60 may be connected (e.g., directly connected) to the output terminal of the power supply circuit 50.

According to some embodiments, each of the plurality of current control circuits 80-1 to 80-3 is configured to adjust the channel current of the corresponding color channel 20/22/24 based on the drive signal from the power supply circuit 50 and a corresponding filtered reference signal (e.g., a pulse width modulated (PWM) signal) from the channel controller 100 and the filter circuit 90. By controlling the color intensity (as measured by lumens, Lm) of each of the red, blue, and green colors output by the color channels 20, 22, and 24, the channel controller 100 may not only enable light dimming, but also adjusts the color mixing of the channels 20, 22, and 24 to replicate light temperatures (temperature in kelvins, K), which follow the black body curve. The channel controller 100 determines the color mix (e.g., the intensity of the red, blue, and green light colors) for each color temperature based on a lookup table that provides the light intensities of the different color channels. The tabulated color mix may accurately follow the black body curve.

The dimmer level may be determined based on a dimmer setting from a dimming controller 200, which may be in electrical communication with the channel controller 100, as shown in FIG. 1. However, embodiments of the present disclosure are not limited thereto. For example, the dimming controller 200 may also be a TRIAC or ELV dimmer at the input source 10. In some examples, the dimmer level at 100% may correspond to an output light intensity of about 5000 lumens.

Figure 2:
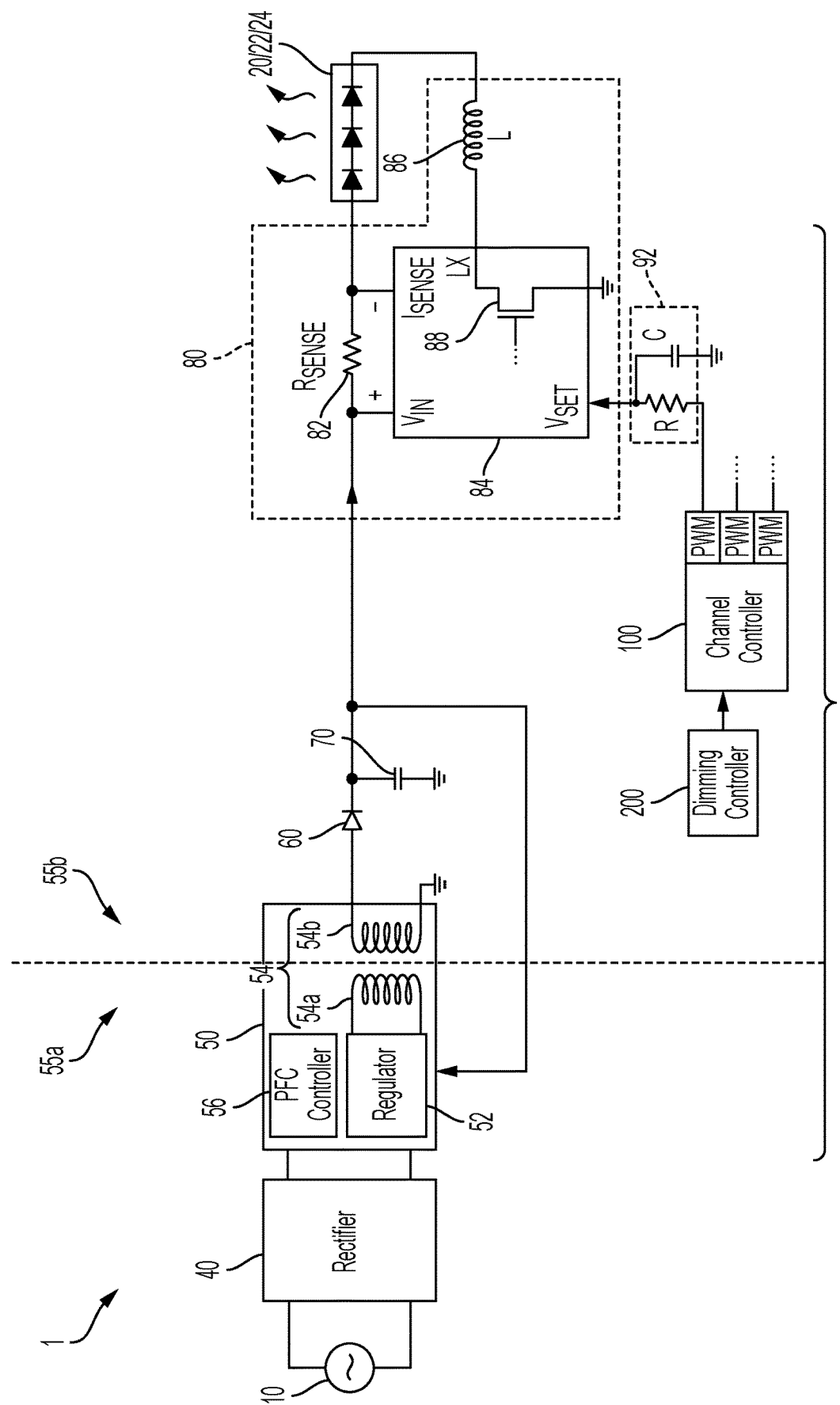
FIG. 2 illustrates a schematic diagram of a current control circuit of the multi-channel light driver, according to some embodiments of the present disclosure.

FIG. 2 illustrates a schematic diagram of a current control circuit 80 of the multi-channel light driver 30, according to some embodiments of the present disclosure.

Referring to FIG. 2, in some embodiments, the current control circuit 80 is electrically coupled to the secondary side 55b of the power supply circuit 50. The current control circuit 80 includes a sense resistor ($R_{SENSE}$) 82 that is coupled between the output of the power supply circuit 50 and the corresponding color channel 20/22/24 and is connected electrically in series with the corresponding color channel 20/22/24. The sense resistor 82 is configured to enable sensing of the channel current ($I_{CHANNEL}$) of the corresponding color channel 20/22/24.

In some embodiments, the current control circuit 80 also includes a regulator (also referred to as a buck regulator, a buck converter, or a step down converter) 84 configured to sense the output voltage of the power supply circuit 50 (e.g., at its $V_{IN}$ input), to sense the channel current via the sense resistor 82 (e.g., at its $I_{SENSE}$ input), to receive the reference signal (e.g., PWM signal) corresponding to the color channel 20/22/24 from the channel controller 100 (e.g., at its $V_{SET}$ input), and to regulate the channel current according to the sensed/received signals. The regulator 84 is configured to sense the current of the color channel 20/22/24 by measuring the voltage drop across the sense resistor 82 (via the $V_{IN}$ and the $I_{SENSE}$ inputs). In some embodiments, the channel current passing through the color channel 20/22/24 is routed back through the regulator 84 (via its LX input) to ground. The regulator 84 includes a switch (e.g., a metal oxide field effect transistor (MOSFET)) capable of switching the channel current on and off based on the sensed output voltage, the sensed channel current, and the reference signal. The current control circuit may also include an inductor 86 coupled between the color channel 20/22/24 and the regulator 84 and positioned in a current path of the channel current 20/22/24, which enables the regulator (e.g., the buck regulator) 84 to produce a regulated current. Thus, by controllably switching the channel current on and off, the regulator 84 may provide down-current regulation of the channel current.

According to some embodiments, to maintain accurate dimming down to 1% while reducing ripple in the channel current, a hybrid DC/PWM signal is applied to the regulator 84 to achieve the benefits of both DC and PWM dimming. In some embodiments, the hybrid DC/PWM signal is a pseudo-sawtooth waveform that is seen as an effective DC voltage when operating above the regulator's cutoff voltage (which may correspond to about 5% or higher dimming) and seen as a PWM signal after entering the cutoff region of operation of the regulator 84 (which may correspond to dimming below 5%).

According to some embodiments, to produce the pseudo-sawtooth signal, the channel controller 100 first generates the reference signal in the form of a PWM signal (e.g., a square PWM signal), which oscillates between two discrete values and has an adjustable/variable pulse width or duty cycle. The PWM signal is then filtered by a low pass filter 92 of the filter circuit 90 to produce the pseudo-sawtooth signal, which is a smoothly varying analog signal having a triangular or substantially triangular waveform. The low pass filter 92 may be a first order RC filter, as shown in FIG. 2; however, embodiments of the present application are not limited thereto, and the low pass filter 92 may be any suitable filter, such as a higher order filter or an RLC filter. Generating the pseudo-sawtooth waveform using a PWM signal and a filter obviates the need for a digital to analog converter (DAC) for each color channel, which would have increased the cost of the light driver.

The mode of operation of the regulator 84 is determined by the cutoff voltage associated with the $V_{SET}$ input, which causes the regulator 84 to shut off when the voltage at the $V_{SET}$ input drops below the cutoff voltage. While the voltage of the reference signal is above the cutoff voltage, the regulator 84 continuously adjust the channel current according to the effective DC value of the sawtooth signal at its $V_{SET}$ input. However, when the voltage of the sawtooth signal drops below the cutoff voltage, the regulator 84 is configured to turn off (e.g., disable the switch 88) thus shutting off the first channel current.

However, embodiments of the present disclosure are not limited to the output stage of the embodiments of FIGS. 1-2. For example, rather than use a regulator at the output stage, some embodiments of the present disclosure may utilize a voltage-controller resistor (VCR) to control the voltage supplied to the light channels.

Figure 3:
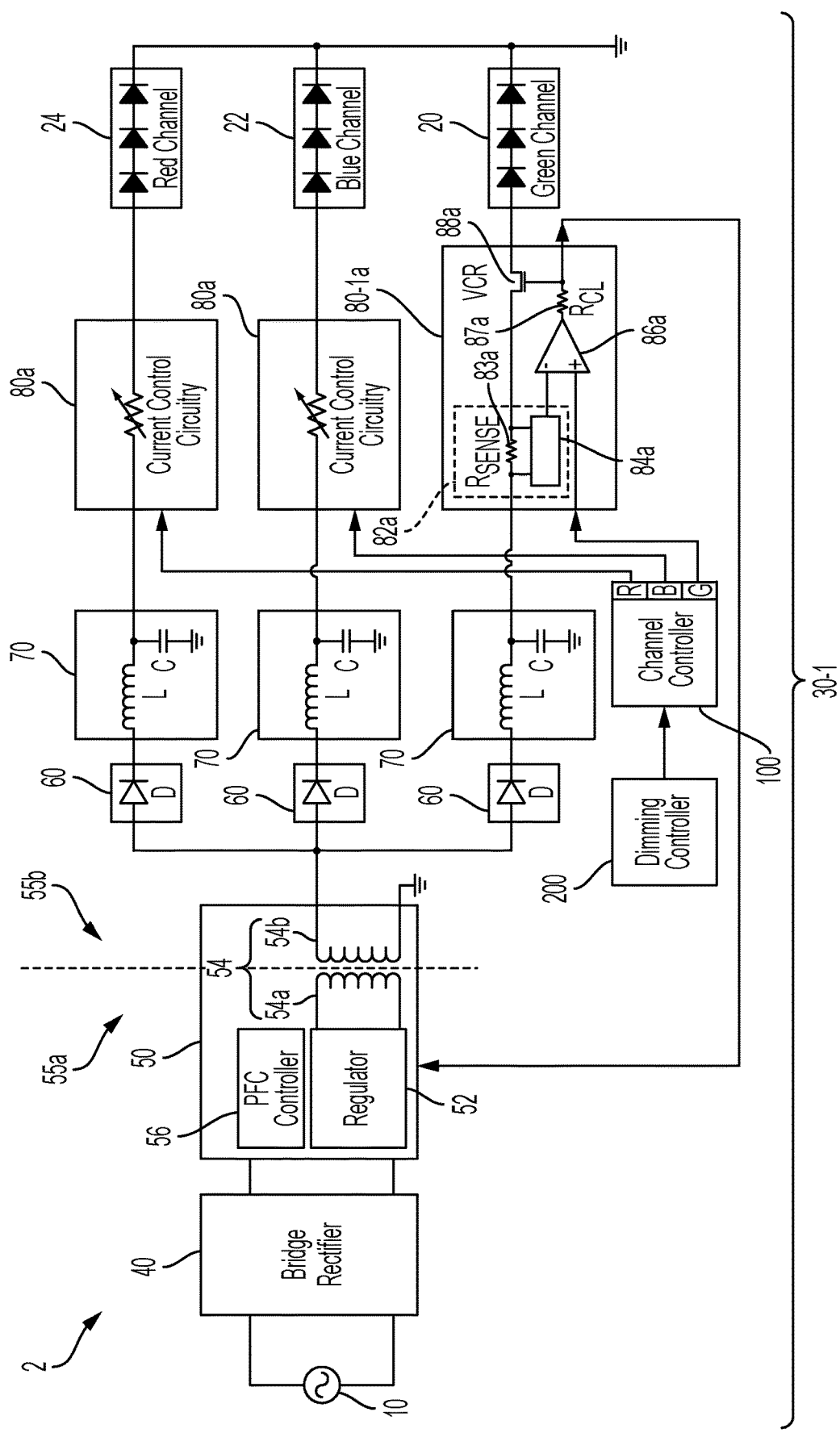
FIG. 3 illustrates a schematic diagram of a current control circuit utilizing a VCR, according to some embodiments of the present disclosure.

FIG. 3 illustrates a schematic diagram of a current control circuit 80a utilizing a VCR, according to some embodiments of the present disclosure.

Referring to FIG. 3, in some embodiments, the current control circuit 80a includes a current sensor 82a configured to sense a channel current ($I_{CHANNEL}$) of the corresponding color channel 20/22/24 and to generate a sense signal; an error amplifier (also referred to as a comparator) 86a configured to receive the sense signal from the current sensor 82a and the reference signal ($V_{REF}$) from the channel controller 100, and to generate the feedback signal (also referred to as an error signal/gate control signal) based on a difference between the reference signal and the sense signal; and a voltage-controlled resistor (VCR, e.g., a linear pass element) 88a that is configured to adjust the corresponding channel current by dynamically adjusting a resistance of the VCR 88a based on the feedback signal from the error amplifier 86a.

In some embodiments, the current sensor 82 includes a sense resistor ($R_{SENSE}$) 83a that is coupled between the output of the power supply circuit 50 and the corresponding color channel 20/22/24 and is connected electrically in series with the corresponding color channel 20/22/24. The current sensor 82a also includes a current sense circuit 84a that is configured to sense a current of the color channel 20/22/24 by measuring the voltage drop across the sense resistor 83a, and to generate the sense signal that is provided to the error amplifier 86a (e.g., to the negative input terminal of the error amplifier 86a).

According to some embodiments, the VCR 88a is electrically connected in series with the sense resistor 83a and the color channel 20/22/24. In some embodiments, the VCR 88a is a field effect transistor (FET), such as a junction FET (JFET) or a metal-oxide-semiconductor FET (MOSFET) that operates in the quasi-saturation region (e.g., linear/ohmic region) and functions as a variable resistor, whose resistance is controlled by the gate voltage.

According to some embodiments, the feedback signal from the error amplifier 86a controls the resistance of the VCR 88a to regulate the channel current to a desired value, which corresponds to the reference signal. As the current control circuits 80a dynamically adjusts the resistance of the VCR 88a in response to the instantaneous changes in the channel current, the current control circuit 80a regulates the channel current to the desired level, as determined by the corresponding reference signal.

According to some embodiments, the channel controller 100 generates a reference signal for each of the plurality of color channels 20, 22, and 24 based on the desired color intensity of the channels. For example, when the color channels include a green color channel 20, a blue color channel 22, and a red color channel 24, the channel controller may generate a first reference signal corresponding to the desired green color intensity to send to the first current control circuit 80a associated with the green color channel 20; may generate a second reference signal corresponding to the desired blue color intensity to send to the second current control circuit 80a associated with the blue color channel 22; and may generate a third reference signal corresponding to the desired red color intensity to send to the third current control circuit 80a associated with the red color channel 24.

Referring to FIG. 3, in some embodiments, the power supply circuit 50 monitors the state of the VCR 88a of the current control circuit 80-1a and adjusts its output voltage (i.e., the output voltage of the secondary winding 54b) to reduce or minimize the voltage drop across the VCRs 88a. In some examples, current control circuit 80-1a corresponds to (e.g., is associated with) the green color channel 20.

In some examples, the feedback signal (also referred to as a correction signal) from the error amplifier 86a that controls the green color channel 20 is communicated to the power supply circuit. In some embodiments, the feedback signal is provided to the PFC controller circuit 56, which may perform power factor correction for the power supply circuit 50.

In some embodiments, when the error amplifier 86a of the current control circuit 80-1a determines to increase the drive current of the green color channel 20 (e.g., when increasing the intensity of the green light), the corresponding feedback signal, which is transmitted to the primary side 55a, notifies the power supply circuit 50-1 to increase its output voltage to ensure sufficient drive voltage for the green color channel 20 (and hence the blue and red color channels 22 and 24). Conversely, when the error amplifier 86a of the current control circuit 80-1a determines to decrease the drive current of the green color channel 20 (e.g., when reducing the intensity of the green light), the corresponding feedback signal notifies the power supply circuit 50-1 to decrease its output voltage to prevent excessive power dissipation by the VCRs 88a.

As such, by properly controlling the voltage headroom, the power supply circuit 50 may provide sufficient drive voltage and current to drive all of the independent color channels, while reducing or minimizing excess power dissipation by the VCRs. The multi-channel light driver 30-1 controls the headroom of all channels by using only a single feedback/control loop from one dominant color channel (e.g., the green color channel), rather than several different feedback loops. This greatly simplifies the control logic of the light driver 30-1, which translates to lower overall cost and size of the system.

According to some embodiments, the components of the light driver 1/2 are packaged within a multi-layered lighting system that has a multi-level printed circuit board (PCB) design that vertically stacks two or more PCB layers coupled by connectors/separators. The components of the lighting system 1/2 are mounted on the top side of the bottom PCB (e.g., main PCB) or on both the top and bottom sides of the remaining PCB board layers (e.g., daughter board layers). These layers may be added or removed in order to provide more space to mount all the components for the lighting system 1/2.

Figure 4:
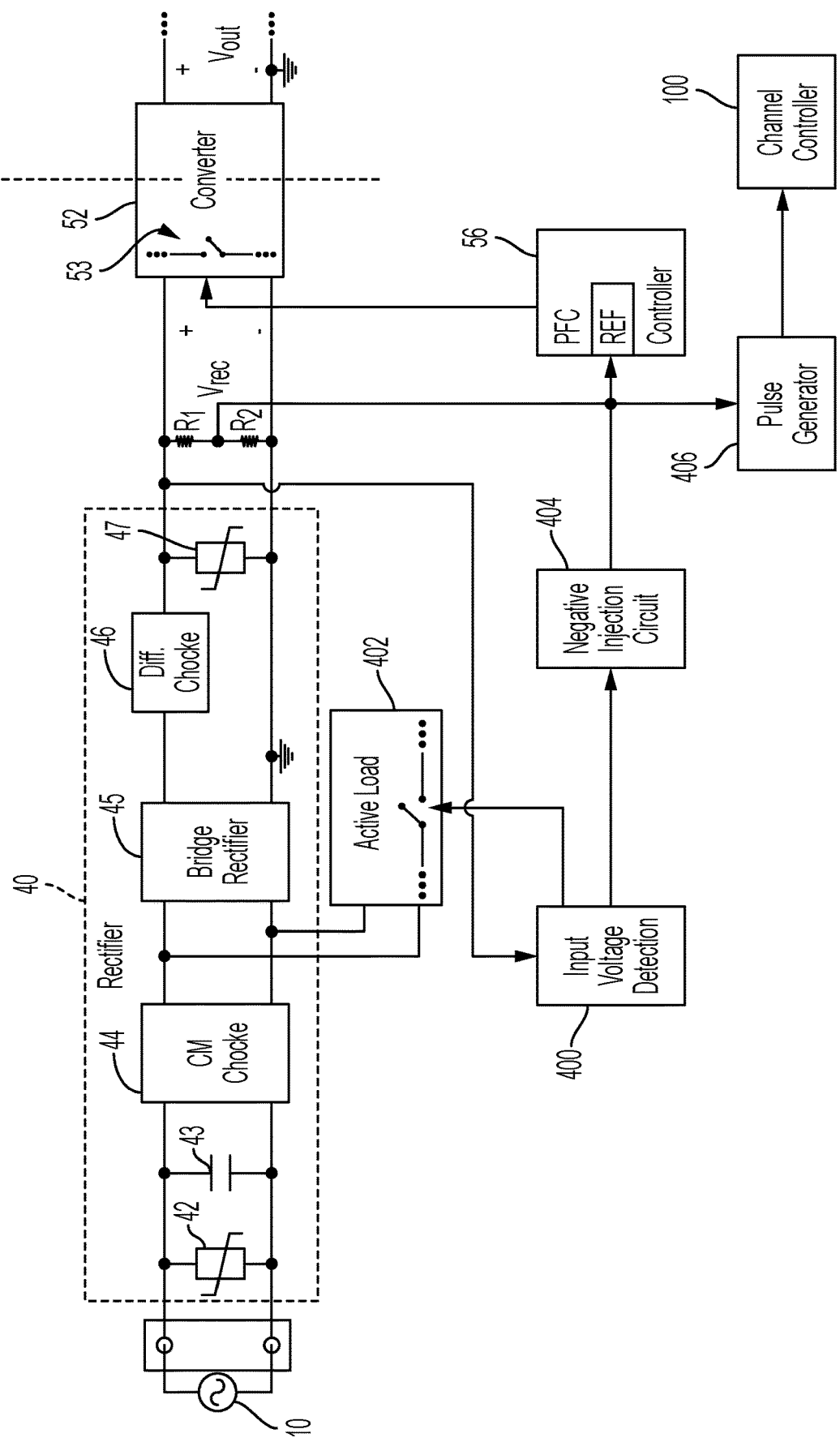
FIG. 4 illustrates a schematic diagram of the input stage of the lighting system, according to some embodiments of the present disclosure.

FIG. 4 illustrates a schematic diagram of the input stage of the lighting system 1, according to some embodiments of the present disclosure.

In some embodiments, the input rectifier 40 of the lighting system 1 includes a first metal oxide varistor (MOV) 42 and a capacitor (e.g., a bulk capacitor 43) coupled in parallel between the two input AC lines, a common-mode (CM) choke 44, a bridge rectifier 45, a differential choke 46, and a second MOV 47 coupled between the input lines to the converter 52.

The MOVs 43 and 47 may aid to suppress differential type spikes, which is where most of the energy of an energy surge is). An MOV may exhibit very high resistance (and essentially become an open circuit) when the input voltage is less than a threshold (e.g., 320 V), but exhibit very low resistance when the input voltage exceeds the threshold and effectively becomes a short circuit that returns the current back to the AC line and prevents the current from entering other parts of the lighting system circuit. As such, the MOV can suppress the massive current surge from a differential type lighting surge. While FIG. 4 illustrates MOVs on both sides of the bridge rectifier 45, embodiments of the present disclosure are not limited thereto, and the input rectifier may include only a single MOV on one side of the bridge rectifier 45. According to some examples, one or more of the MOVs 42 and 47 may be replaced with a transient voltage suppression diode (TVSD).

The CM choke 44 may suppress a common-mode electrical surge and may act as an EMI filter which substantially reduces or prevents fast transients from getting into or out of the lighting system 1. The CM choke 44 may be include two inductors (one on each AC line) that share the same core. The differential-mode choke 46 which may be on only one of the two input lines can aid to suppress differential-mode electrical surges.

According to some embodiments of the present disclosure, the input stage of the lighting system 1 includes an input voltage detector 400, an active load 402, a negative injection circuit 404, and a pulse generator 406.

The input voltage detector 400 that is configured to detect the voltage level of the haversine signal at the input of the converter 52. For example, the input voltage detector 400 may determine whether the input voltage is about 120 V or about 277 V or higher. When the detected voltage is about 120 V, the input voltage detector activates the active load 402 that is coupled to the input AC lines (e.g., between the CM choke 44 and the bridge rectifier 45). The active load 402 is primarily a resistive load that improves the performance of a TRIAC dimmer that may be coupled to the input of the lighting system 1. As TRIAC dimmers are not utilized at input voltages higher than 120 VAC, the input voltage detector 400 deactivates the active load 402 when the detected voltage is above 120 V.

Conversely, the input voltage detector 400 deactivates the negative injection circuit 404 when the input voltage is 120 V, and activates the negative injection circuit 404 when the input voltage is higher than 120 V (e.g., when it is 277 V or higher).

When sampling voltage for the reference pin of the PFC controller 56, it is desirable for the shape of the rectified input voltage Vrec to be preserved as the inductor current of the converter 52 is limited by the sampled voltage which is fed to the reference pin REF of the PFC controller 56. According to some embodiments, the negative injection circuit 404, which is also electrically connected to the reference pin REF of the PFC controller 56, helps to preserve the voltage signal which enters the reference pin REF. This, in turn, allows the light driver 30 to maintain proper power factor and low total harmonic distortion (THD) of the input line current.

Without the negative injection circuit 404, an issue may arise when operating the light driver 30 at low loads where insufficient current is drawn by the load to fully discharge input filter capacitors that are incorporated in the converter 52 to hold the voltage up. The input filter capacitors serve to hold the voltage and it is desirable for them to be fully discharged prior to the next cycle of the rectified voltage.

According to some embodiments, the downshifting of the sampled rectified signal by the negative injection circuit 404 ensures that the light driver 30 is able to operate efficiently by keeping the inductor current of the converter 52 in-phase and at the same fundamental frequency as the sampled rectifier voltage, thus providing a high power factor and low THD.

Also, when the light driver 30 is operating at low output levels, the on time of the PFC controller may be lowered and high frequency switching at the converter 52 may increase. An increase in high frequency switching may induce more common mode noise that is observed entering the reference pin REF of the PFC controller 56. Because injecting a negative voltage to the reference pin REF to shift the sampled rectifier output voltage Vrec ensures that the light driver 30 is able to operate efficiently (by keeping the inductor current of the converter 52 in phase and of the same fundamental frequency as the sampled rectifier voltage), high frequency switching at the converter 52 may decrease, which may result in less common mode noise.

As described above, the negative injection voltage-VDC supplied by the negative injection circuit 404 to the reference pin of the PFC controller 56 shifts the sampled rectifier signal downward in such a way that the signal entering the reference pin is that of a shifted haversine signal which has valleys that reach zero or close to zero (e.g., as close to zero as possible). Shifting the sampled haversine signal to reach zero or substantially zero ensures that high PF and low THD can be obtained. Without the valleys reaching near zero, the PFC controller 56 may not be able to properly maintain the inductor current in phase with, or of the same fundamental frequency as, the sampled voltage signal. The amount of negative voltage injected may be automatically adjusted by sensing the AC voltage and/or AC current that enters the drivers input. Further, the circuitry serves to reduce common mode noise that enters the multiplier pin.

In some embodiments, the pulse generator circuit 406 is coupled to the output of the rectifier 40 through a first voltage divider with first and second resistors R1 and R2 that attenuates the rectified input line voltage Vrec to produce a rectified signal, which the pulse generator circuit 406 utilizes to generate a pulsed signal (e.g., a pulse-width-modulated (PWM) signal) that corresponds to the signal received by the rectifier 40, which may be a chopped waveform from a dimmer (e.g., a TRIAC dimmer or a 0-10V dimmer). Thus, the pulsed signal is indicative of the light dimming level (e.g., the dimming level set by a user via a phase-cut dimmer). As such, the pulse generator circuit 406 provides this signal to a PWM input of the channel controller 100 so that the controller 100 may determine the dimming level set by a user at the phase-cut dimmer and adjust the light output intensity of the light channels 20/22/24 accordingly.

Figure 6:
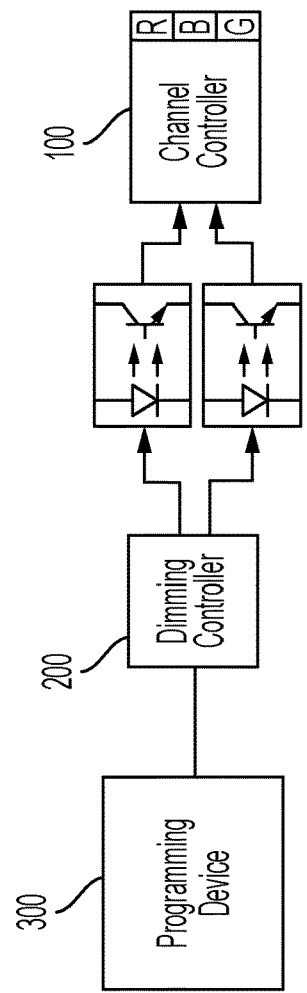
FIG. 6 illustrates the connection between the programming device, the dimming controller, and the channel controller of the lighting system, according to some embodiments of the present disclosure.
Figure 5:
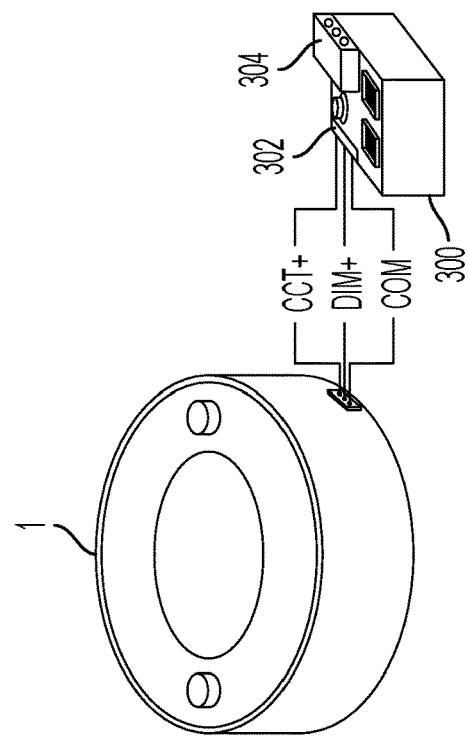
FIG. 5 illustrates a programming device of the lighting system, according to some embodiments of the present disclosure.

FIG. 5 illustrates a programming device 300 of the lighting system 1, according to some embodiments of the present disclosure. FIG. 6 illustrates the connection between the programming device 300, the dimming controller 200, and the channel controller 100 of the lighting system 1, according to some embodiments of the present disclosure.

Referring to FIGS. 5-6, in some embodiments, the CCT value and the dimming level of the lighting system 1 may be set or programmed in memory by a programing device 300 is capable of initiating programming mode of the lighting system 1. During normal operation, the lighting system 1 may rely on the programmed values to set/determine the CCT and/or dimming level of the output light. In some examples, the programming device 300 may connect to and interfacing with the dimming controller 200 of the programmable lighting system 1 via lead wires 302 or a block connector 304.

Because the lighting system 1 is a self-contained light engine whose only connection to the outside world is through the two AC input lines, and the lead wires/connector to the programming device 300, it is desirable to electrically isolate the dimming controller 200 from the rest of the circuit within the lighting system 1. As such, in some embodiments, the dimming controller communicates the programming values of the dimming level and CCT values to the channel controller 100 via one or more optocouplers. By maintaining this electrical isolation, the lighting system 1 may also satisfy the EMI requirements that are imposed on devices that connect directly to wall AC.

According to some embodiments, the compact lighting system 1 includes the power supply, which converts AC to DC, and the light source (e.g., LEDs) in one compact package having a round aperture. The lighting system 1 is fully configurable and can be programmed (on the production line or in operation) to produce any light output color, and any light intensity (e.g., 3 k or 4 k lumen). It also has a transceiver onboard that allows it to be reprogrammed at any time (e.g., after installation). This eliminates the need to produce and manufacture different lights for different applications, which greatly reduces inventory and can improve product profitability. In some examples, the lighting system 1 is intended to be a replacement for a chip on board (COB) light that includes a panel of tightly packed LEDs (i.e., high density of LEDs in a small area) and is capable of emitting a powerful and consistent/uniform beam (e.g., conical beam) of light. COBs, and hence the lighting system 1 of the present disclosure, can be used for aesthetics purposes in architectural designs, or can be used for illumination in general lighting applications. Commercially available COBs have a standard size, which this lighting system 1 needs to fit to. In some embodiments, the physical properties (e.g., form factor, dimensions, etc.) of the can of the lighting system 1 conform with the Zhaga standard defined by the Zhaga consortium (https://www.zhagastandard.org).

The input to the system 1 is an AC signal that may be provided by a neutral line and one power line from the wall (i.e., no ground line). The lighting system 1 may receive AC input from about 90 VAC to about 305 VAC (which is considered to be a high voltage). The system 1 performs the voltage conversion (AC-DC), and produces the desired light output. This is in contrast to the related art in which the light engines input DC voltages and relay on external power supplies that convert wall AC into a DC voltage. By incorporating the AC-DC voltage converting power supply into the same package as the light driver, the system 1 eliminates the need for an additional power supply, which saves cost and simplifies installation. However, as a result of this integration, the lighting system 1 encounters significant issues related to high voltages requirements, powerline quality requirements, thermal concerns, and insulation requirements, which the related art need not be concerned with nor address. Thus, embodiments of the present disclosure include features and solutions that significantly alleviate or completely eliminate the above concerns.

As noted above, one challenge to be overcome by the lighting system 1 is complying with power line quality requirements, which demand that the lighting system 1 be able to withstand lightening surges of about 2500 V on the AC lines at the input of the lighting system 1, which are the only high-voltage input into the unit. Two different types of surge that the lighting system 1 can withstand include differential surge between the two AC lines, and common mode surge, which is between one of the AC lines and ground. Both types of surges may be suppressed at least in part by the MOVs 42 and 47 of the rectifier 40 (see, e.g., FIG. 4).

Further, the lighting system 1 has to satisfy mandatory safety requirements related to insulation. As such, the lighting system 1 strategically employs insulation to avoid arcing between components, which could otherwise damage or destroy such components and to make the unit safe to touch by a user.

The light engines of the related art do not include any high energy surge suppression (only low level static charge/discharge) as, in the related art, the AC-DC power supply is outside of the lighting unit, and the power line quality requirements are exported to the external power supply, and thus not addressed by the light engine. Further, as the light engines of the related art operate at low voltages, user safety issues are minimal or non-existent. The following will describe in further detail the intelligent packaging of components and insulation use that allows all of the necessary components lighting system 1 to satisfy the added power line surge and insulation requirements.

Furthermore, thermal considerations are of great importance to the lighting system 1 as it incorporates the heat-generating light source (e.g., LEDs) within the same small can/packaging as all other components, and unless the generated heat is not dissipated properly, the rise in temperature within the light sources and the internal components can adversely affect the operation of the lighting system 1. Thus, in some embodiments, the lighting system 1 utilizes a metal heat sink as its backing which may efficiently transfer the internally-generated heat to the outside (e.g., via a heatsink fixture attached to the back of the lighting system 1).

Additionally, as the lighting system 1 is capable of directly connecting to wall AC, it has to satisfy stringent EMI requirements (such as class B and FCC/worldwide requirements related to radiative emissions) that include not injecting noise on, and not adding extra harmonics or distortions to, the AC input lines, and limiting radiative noise outside of the lighting system packaging/can. The primary switch 53 (also referred to as a main or driving switch or transistor) within the converter 52 (see, e.g., FIG. 4), which is controlled by the PFC controller 56, switches and pumps power rapidly during normal operation (e.g., at about 200 KHz) and produces a lot of broadband noise (e.g., common mode noise) and ringing throughout the circuitry of the lighting circuit 1. As the circuitry of the light driver 30 sits atop the metal backplate and is insulated from it by thin insulating layers, this structure acts as a large capacitor that may direct much of this noise (e.g., common mode noise) to the ground plane of the metal backing and thus the rest of internal circuitry. Accordingly, as will be described below, embodiments of the present disclosure address this issue through a variety of techniques.

Figure 7A:
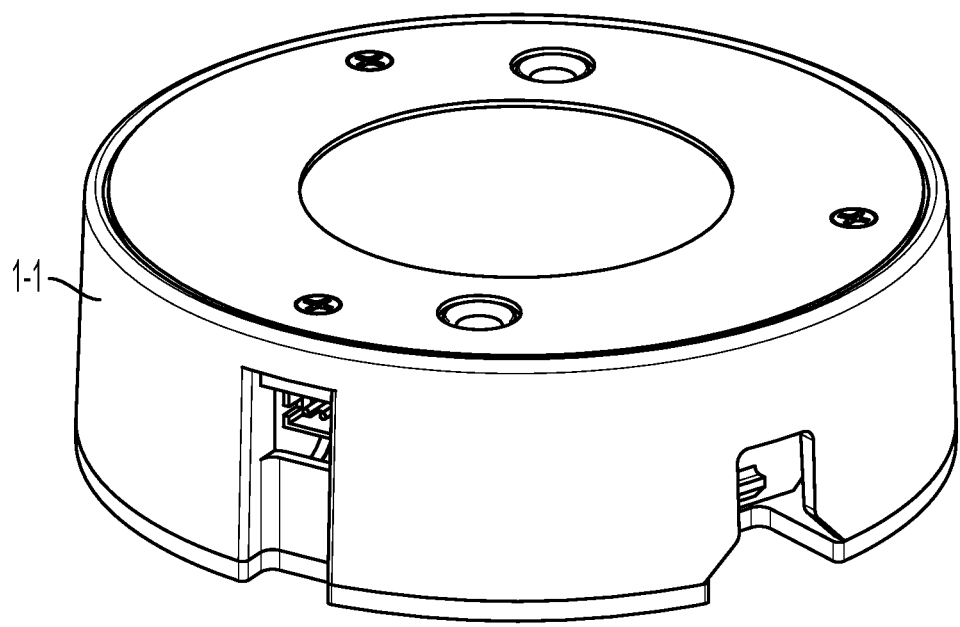
FIG. 7A illustrates a perspective view of a lighting system, according to some embodiments of the present disclosure.
Figure 7B:
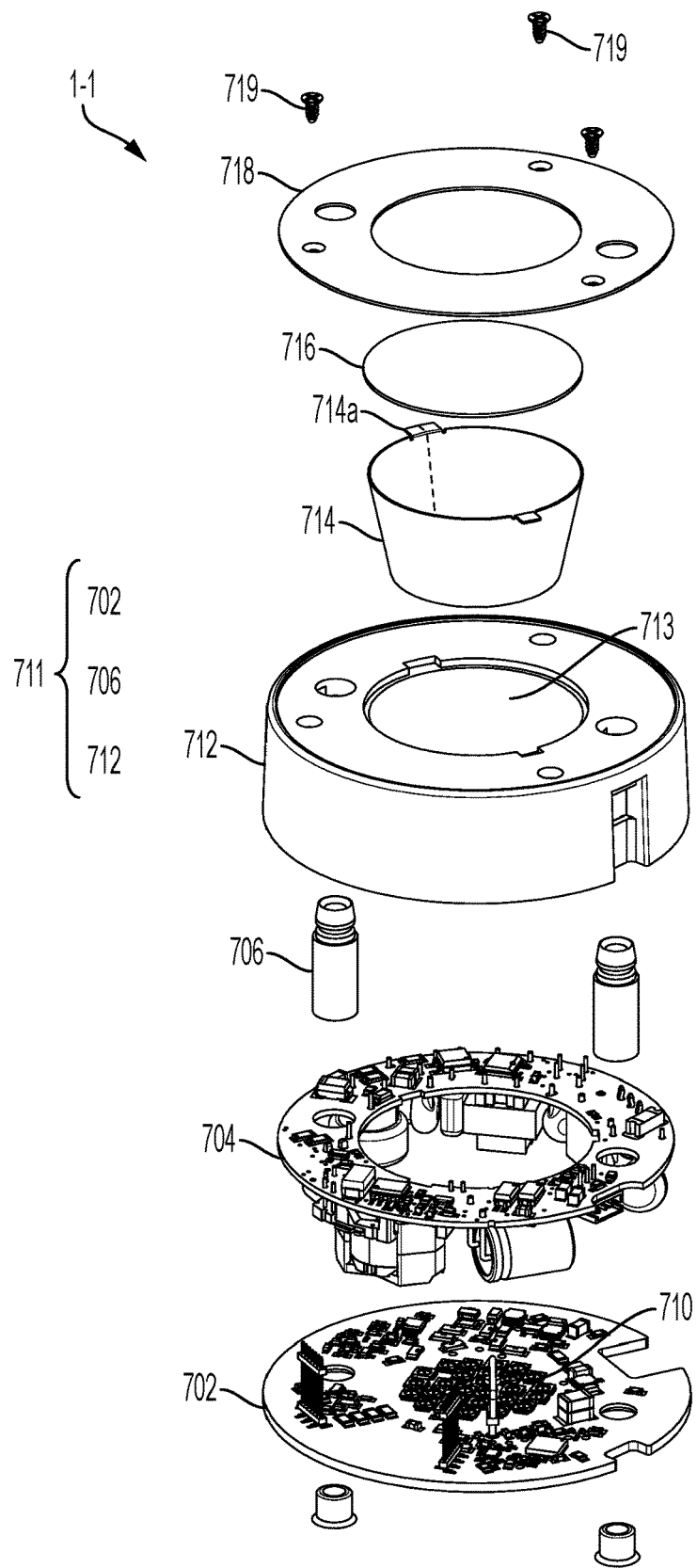
FIG. 7B illustrates an exploded perspective view of the lighting system, according to some embodiments of the present disclosure.
Figure 7C:
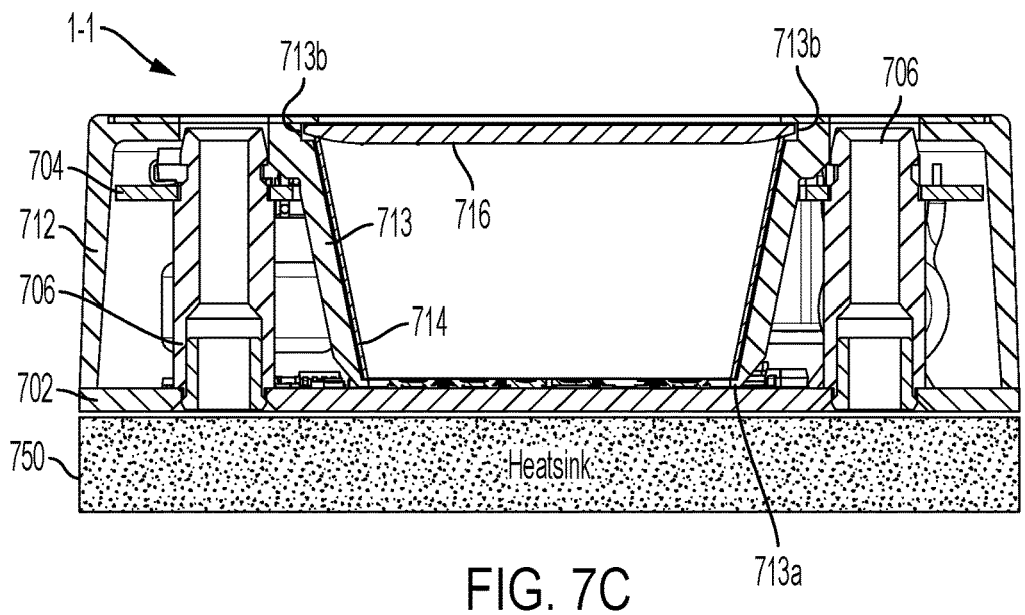
FIG. 7C illustrates a cross-sectional view of the lighting system, according to some embodiments of the present disclosure.
Figure 7D:
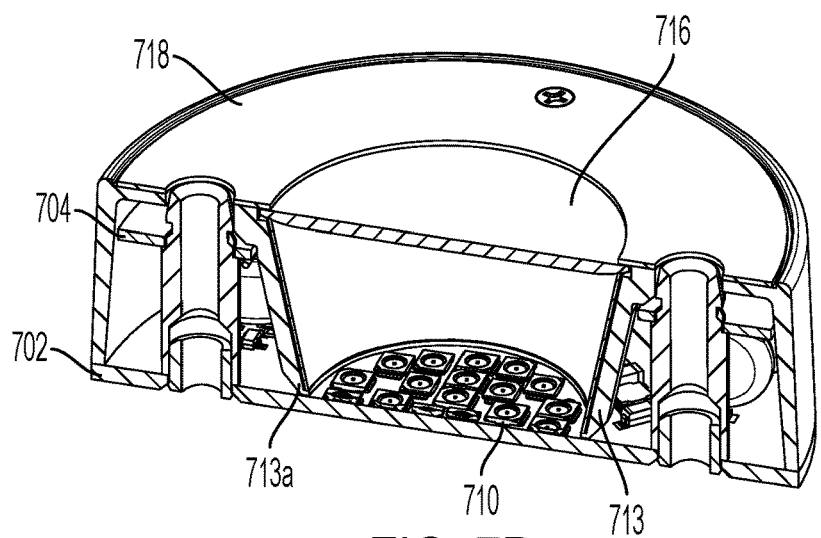
FIGS. 7D and 7E illustrate cutaway perspective views of the lighting system equipped with two different LED arrays, according to some embodiments of the present disclosure.
Figure 7E:
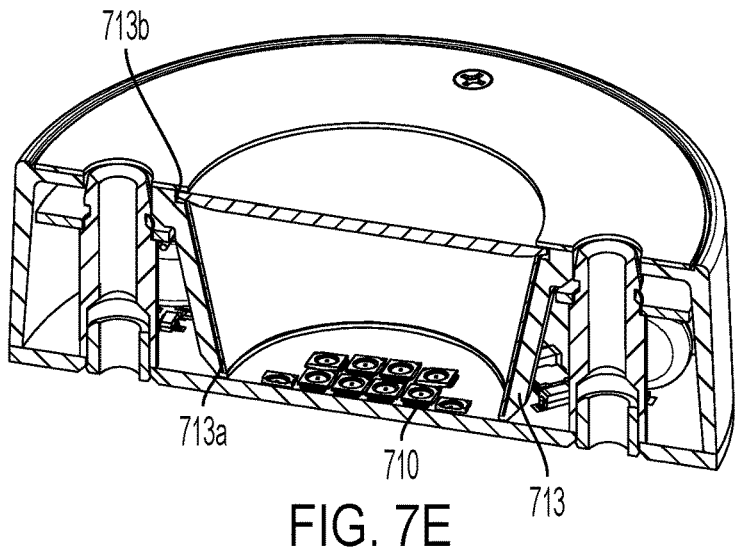

FIG. 7A illustrates a perspective view of the lighting system 1-1, according to some embodiments of the present disclosure. FIG. 7B illustrates an exploded perspective view of the lighting system 1-1, according to some embodiments of the present disclosure. FIG. 7C illustrates a cross-sectional view of the lighting system 1-1, according to some embodiments of the present disclosure. FIGS. 7D and 7E illustrate cutaway perspective views of the lighting system 1-1 equipped with two different LED arrays, according to some embodiments of the present disclosure. FIGS. 7F and 7G illustrate exploded perspective views of the two PCB layers of the lighting system 1-1 on which the internal electrical components are mounted to, according to some embodiments of the present disclosure. FIG. 7H illustrates a cross-sectional view of the two PCB layers of the lighting system 1-1, according to some embodiments of the present disclosure.

Referring to FIG. 7A, the lighting system 1-1 is a tunable AC-input white LED engine having a wide light-emitting surface (LES) and high lumen output, which makes it suitable for general illumination applications. In some examples, the lighting system 1-1 may be a cylindrical light fixture having a diameter of about 65 mm; however, the diameter is not limited thereto and the diameter may be about 61 mm or less. The flat top may have an aperture (e.g., a round lens) with an LES of about 32 mm. The light system 1-1 may be able to produce high light output of about 2500 lm or even as high as 5000 lumens across a range of CCT settings. In some examples, the lighting system 1-1 may utilize 3-channel de-saturated (Fusion) LEDs to achieve precise blackbody line (BBL) tuning.

Referring to FIG. 7B, the lighting system 1-1 has a 2-layer structure including a first layer (e.g., a first printed circuit board (PCB) layer or a substrate PCB layer) 702, and a second layer (e.g., a second PCB layer) 704 coupled to and vertically offset from the first layer 702 by two or more base posts 706. The first layer 702 may include a single-layer (e.g., a single-metal-layer) PCB, and the second layer 704 may include a PCB with one or more layers (e.g., metal layers). In some embodiments, the first layer 702 includes a metal layer on its rear side/backside (which faces away from the second layer 704), which may act as a heatsink for the components mounted on its top side (which faces the second layer 704).

In some embodiments, the first layer 702 has a first component area at its periphery and a first light area at its center, and the second layer 704 has a second component area overlapping the first component area of the first layer 702 in a plan view and has a first opening overlapping the first light area of the first layer 702 in a plan view. The first component area may surround the first light area, and the second component area may surround the first opening. Electronic components may be laid out on the top surface of first layer 702 (mostly or entirely within the first component area), and on one or both sides of the second layer 704 (within the second component area).

In some embodiments, the integrated multi-layered lighting system 1-1 includes a light source 710 that includes a plurality of light emitting diodes (LEDs) coupled to the first layer 702 and positioned in the first light area, which corresponds to the first opening of the second layer 704. The first opening of the second layer 704 allows for the light produced by the light source 710 to pass through the second layer 704 without obstruction and to illuminate the target environment. The light source 710 may include one or more green LEDs of the green channel 20, one or more blue LEDs of the blue channel 22, and one or more red LEDs of the red channel 24. In some examples, the LEDs 710 are unsaturated LEDs, which serve to provide a more vibrant and consistent color to illuminated objects as compared to saturated LEDs. Unlike saturated LEDs, which may lack certain bands of light from the visible light spectrum, unsaturated LEDs produce light evenly among the spectrum and consistently fill in empty spaces on the light spectrum that otherwise may not be filled by saturated LEDs.

In some embodiments, the lighting system 1-1 includes a housing 711 that encases/encapsulates the components within the lighting system 1-1, such as the power supply 50, the light driver 30, and the light source 710, and protects them from the elements. The housing 711 may include a base plate that may be the first layer 702, a case cover 712, and the base posts 706 that are configured to couple the base plate 702 and the case cover 712. At its center, the case cover 712 may have an inwardly tapered portion (e.g., an inner wall or an inner/inward extension portion) 713 that defines a housing opening (e.g., an inwardly tapered opening) that can act as a light tunnel directing light produced by the LEDs 710 to the outside. The inwardly tapered portion 713 has an inner diameter that increases in a vertical direction away from the light source 710 toward the outside (e.g., towards the lens 716). The bottom edge 713a of the tapered portion 713 having the smallest inner diameter may encapsulate the light source 710 in a plan view (i.e., the light source 710 is entirely within the opening of the housing 711 in a plan view. A reflector (e.g., tapered reflector; such as, a metal reflector) 714 may be placed inside the case/housing opening (e.g., on the inwardly tapered portion 713) to reflect light of the light source 710 incident on the interior surface of the tapered portion 713 of the case cover 712 to the outside, and thus ensure that the light produced by the light source 710 is not absorbed by the interior walls of the case/housing opening. This may improve (e.g., increase) the light extraction efficiency of the lighting system 1-1. As shown in FIG. 7B, the reflector 714 may have one or more lips 714a that fit within corresponding notches in the case cover 712 and thus allow the reflector 714 to stay in a fixed position relative to the case cover 712. A lens (e.g., a glass lens) 716 may fit within a peripheral notch (or stepped portion) 713b of the case cover 712 and be held in place above the light source 710 by a cap (e.g., a ring-shaped hold-down cap) 718 that is configured to be fixedly attached to (e.g., fastened or screwed to) the top of the case cover 712, for example, via one or more screws 719.

The base posts 706 may extend vertically from the base plate 702 to the top of the case cover 712 within the interior space of the housing 711. The base posts 706 may not only couple the case cover 712 to the base plate 702, but they also support the second layer 704 above the base plate 702. In some examples, the base posts 706 may have a hollow interior allowing a fastener to pass therethrough and couple the lighting system 1-1 to a heatsink mount (e.g., a fixture heatsink) 750, which may be a passive heat exchanger or an active heat exchanger (e.g., including a fan).

As the light source 710 may generate a lot of heat in the tightly confined space of the lighting fixture 1-1, thermal management is an important consideration for proper and stable operation of the lighting system 1-1.

To improve the dissipation of heat generated by the light source 710, the first layer 702 includes a metal core layer at its backside opposite to the light source 710, which is thermally and electrically conductive and is configured to be mounted to a heatsink mount 750. The metal core layer is configured to provide electrical ground to the light source 710 and other electrical components on the first layer 702, and to transfer (e.g., dissipate) the heat generated by the light source 710 during operation to the lighting system 1-1. The metal core layer may be a metal plating that extends continuously or substantially continuously across the bottom surface of the first layer 702 and has sufficient thickness to maintain the temperature of the light source 710 at a desired temperature range of, for example, about 30° C. to about 40° C. Without the heat sink properties of the metal core layer 106, the LEDs 710 may operate at significantly higher temperatures (e.g., about 20° C. to 30° C. higher), which could lead to a change in the LED characteristics and to an undesirable change in the color and intensity of the light output of the lighting system 1-1. In some examples, the metal core layer includes a thermally and electrically conductive material (e.g., one with sufficiently low heat resistance and electrical sheet resistance), such as aluminum, copper, and/or the like. The metal core layer may act as the safety ground of the lighting system 1-1.

The lighting system 1-1 includes a plurality of first components coupled to the first layer 702 and positioned in the first component area, and a plurality of second components coupled to the second layer 704 and positioned in the second component area. According to some embodiments, the plurality of first components include surface-mount electrical components, and the plurality of second components include through-hole-mounted electrical components. In some examples, the first components 208 may not include any through-hole components to avoid utilizing plated/insulated vias to insulate through-hole pins of such components from the grounded metal core layer 206, which could increase cost of the lighting system 1-1.

The first components may be positioned on (e.g., soldered to) the top surface (i.e., forward-facing side) of the first layer 702 that is opposite from the metal core layer, and are electrically coupled to one another via a plurality of traces. The second components may be placed on at least one of the rear-facing side of second layer 704 (which faces the top side of the first layer 702) and the top side (i.e., forward-facing side) of the second layer 704 (which is opposite from the bottom side of second layer 704), and are connect to one another through traces running on the top and/or bottom of the second layer 704. The second components on opposite sides of the second board 210 may also be electrically connected through one or more electrical vias within the second layer 704.

Referring to FIGS. 7F-7H, in some examples, the plurality of first components mounted to the first layer 702 may include the channel regulators 80, the input voltage detector 400, the pulse generator 406, and the channel controller 100. The plurality of second components mounted to the second layer 704 may include the rectifier 40 (and its many constituent components, such as input bulk capacitor 43, the CM choke 44, and differential choke 46), the active load 402, the negative injection circuit 404, the PFC controller 56, the converter 52 (including the switch 53), the bus rectifier 70, the dimming controller 200 and the associated one or more optocouplers. Thus, the noisy, high voltage and fast switching components of the lighting system 1-1 may be mounted to the second layer 704, which are separated from the quieter and lower-voltage elements of the lighting system 1-1 via an air gap between the first and second layers 702 and 704. As the primary switch 53 of the converter 52 may heat up during normal operation, a heatsink (e.g., a copper heatsink) may be placed on it to help dissipate heat and improve thermal management.

In some embodiments, to further improve vertical space utilization, one or more of the second components, such as the differential choke may be mounted to one side of an intermediary board (e.g., choke holder) 46a, which is fixed to and offset from the bottom surface of the second layer 704. This allows other components (e.g., small resistors and capacitors of, e.g., the active load 402) to be mounted to the other side of the intermediary board 46a thus resulting in even more space savings and thus achieving a higher part density within the confined packaging of the lighting system 1-1.

As there is an air gap between the first and second layers 702 and 704, to improve space utilization and bulkier of the second components (e.g., 43, 44, 46, 53, 54, 70, and 705) may be mounted to the underside of the second layer 704, which faces the first layer 702. Additionally, by placing these components, which also may be the some of the main heat producers in the lighting system 1-1 (aside from the light source 710), in close proximity to the metal back plate of the first layer (and hence the fixture heatsink mount 750), heat dissipation may be improved and thermal management may be improved. Thermal gap pads may be placed between the bottom surfaces of one or more of these components and the components and/or first layer below, which can further improve heat dissipation through the back metal plate. The thermal gap plates may have a low thermal resistance (be thermally conductive), but be electrical insulators so as to avoid creating unintentional electrical connections between components of the first and second layers 702 and 704. Further, the adhesive nature of the thermal gap pads helps to improve the stability and structural integrity of the two layers 702 and 704 (as they are otherwise held together by two base posts 706).

In some examples, the second components mounted on the second layer 704 may be electrically connected to the first components of the first layer 702 via one or more electrical connectors/links 703.

In some embodiments, the channel controller 100 has an internal wireless transceiver (e.g., with bluetooth and/or wifi capability), which may allow the lighting system 1-1 to be dimmed or generally programmed remotely. As such, an antenna 101 of appropriate length may be coupled to the first layer 702 (e.g., via an antenna pin and connector) and may extend over the second layer 704 as shown in FIGS. 7F-7H.

As noted earlier, in the embodiments of FIGS. 7A-7H, the conductors (e.g., traces and other metal components and leads) on the top surface of the first layer 702 together with the insulation layer below and the back metal plate create a large capacitor that attracts much of the noise (e.g., common mode noise) generated by the lighting system 1 (e.g., by the primary switch 53) to the metal backplate, which acts as both a heatsink and a safety ground, and thus to the other components of the lighting system 1 based on impedances. In effect, the backplate may acts like a magnet for common mode noise. It is desirable to redirect the impedances so that the noise comes back from the ground plate to the primary switch 53 in the converter 52, which is where much of the noise originates from. Thus, according to some embodiments, the lighting system 1-1 further includes a strategically-placed decoupling cap (of, e.g., about 4.7 μF) that is electrically connected between the safety ground of the back plating of the first layer 702 and the local ground (e.g., driver ground) of the circuitry of the lighting system 1-1. The decoupling cap provides a capacitive return path for the high dV/dt common noise back to the primary switch 53 of the converter 52. Because, when installed, the backplate of the first layer 702 may be connected to earth ground and because the input AC voltage to the lighting system may be several hundred VAC, there may be a significant voltage difference between the safe ground (e.g., earth ground) and the driver ground. Additionally, this voltage difference may reach 2-3 kV in the case of surges (e.g., lighting surges). As such, the decoupling capacitor 720 may have a high voltage rating and be capable of withstanding 4 kV surges. Therefore, the decoupling capacitor 720 may be a physically large component.

In some embodiments, in order to electrically connect the decoupling capacitor 720 (i.e., the surface-mount safety capacitor) in an efficient manner, this large capacitor 720 is placed near the grounded post 706 that connects to the aluminum/copper plate at the back of the first layer 702. In some examples, an electrode of the decoupling capacitor 720 may be soldered to the base post 706 as it is metallic and connected to the backplate. However, creepage/clearance requirements (of, e.g., 2.5 mm) around the solder may use up valuable space on the first layer 702 and performing the solder during the manufacturing process may be a difficult/expensive operation. In other examples, this connection may be established though a via that passes through the first layer 702; however, this introduces similar creepage limitations around the via, which may also complicate trace routing on the layer 702. Therefore, in some embodiments, an electrode of the decoupling capacitor 720 is connected to a wire that protrudes/projects into the hole 706a through which the base post 706 is to pass, and once the post 706 is pressed through that hole 706a, it pulls the wire down along the vertical path. As such, the wire can run vertically on the side of the post 706 and hole 706a and connect to the aluminum/copper backing. Therefore, this may establish a good solid electrical connection between the cap electrode and conductive backplate. The other electrode of the decoupling/safety capacitor 720 is connected to the driver ground, which is routed back to the primary switch 53 on the second layer 704 through a vertical pin/link connecting the two layers 702 and 704 to one another. This presents a priority path (decoupling path) for noise. That is, it offers a lowest impedance path for the noise to go from the backplate back to the primary switch 53. The decoupling/safety capacitor 720 blocks a DC current path through it, and its capacitance is small enough such that the AC leakage current is small.

In some embodiments, the base posts 706 are insulated from ground (e.g., safety ground). For example, the base post 706 may made of insulating materials to prevent components of the lighting system 1-1 from being accidentally connected to electrical ground. In some examples, the base posts 706 may be made of conductive material and be safety grounded. In such examples, it is desirable to insulate the posts from the rest of the lighting system circuit. Therefore, the housing 711 may include insulated post covers (e.g., plastic post covers) that cover and insulate the base posts 706 and prevent other electrical components from making physical and electrical contact with the base posts 706. In some examples, post insulation may be achieved through wrapping insulative tape around the post. However, these are merely examples, and any other suitable means of insulating conductive base posts 706 from the lighting system circuitry may be employed.

In some examples, the first layer 702 may be substantially circular and the second layer 704 may have a ring shape. Further, the first and second layers 702 and 704 may have the same or substantially the same diameter; however, embodiments of the present disclosure are not limited thereto, and the first and second layers 702 and 704 may have any suitable shape and size to fit within a compact housing or an existing wall fixture.

Accordingly, as described above, the multi-tiered design of the lighting system 1-1 provides additional surface area to mount the various components of the light driver 30 in the vertical direction, which allows the lighting system 1 to have a more compact design with a smaller footprint, as compared to designs of the related art.

Figure 8A:
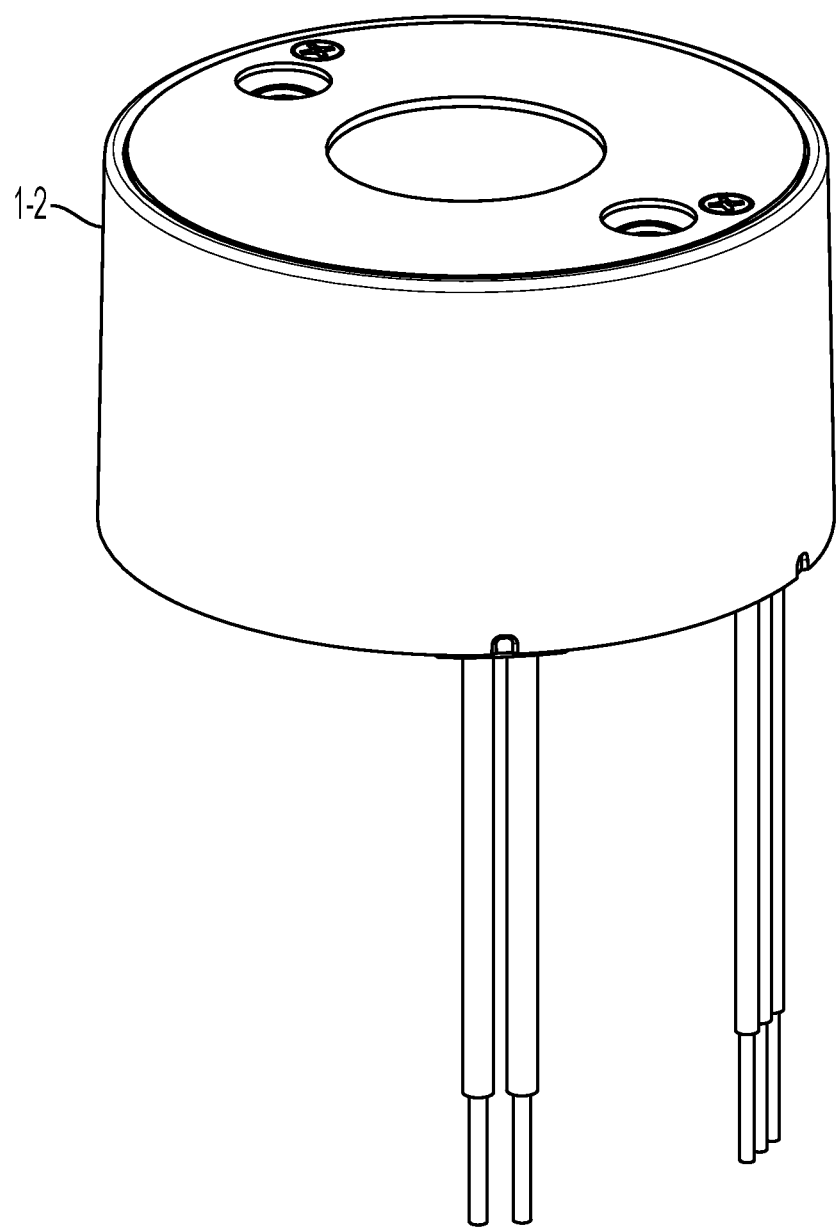
FIG. 8A illustrates a perspective view of a lighting system, according to some embodiments of the present disclosure.
Figure 8B:
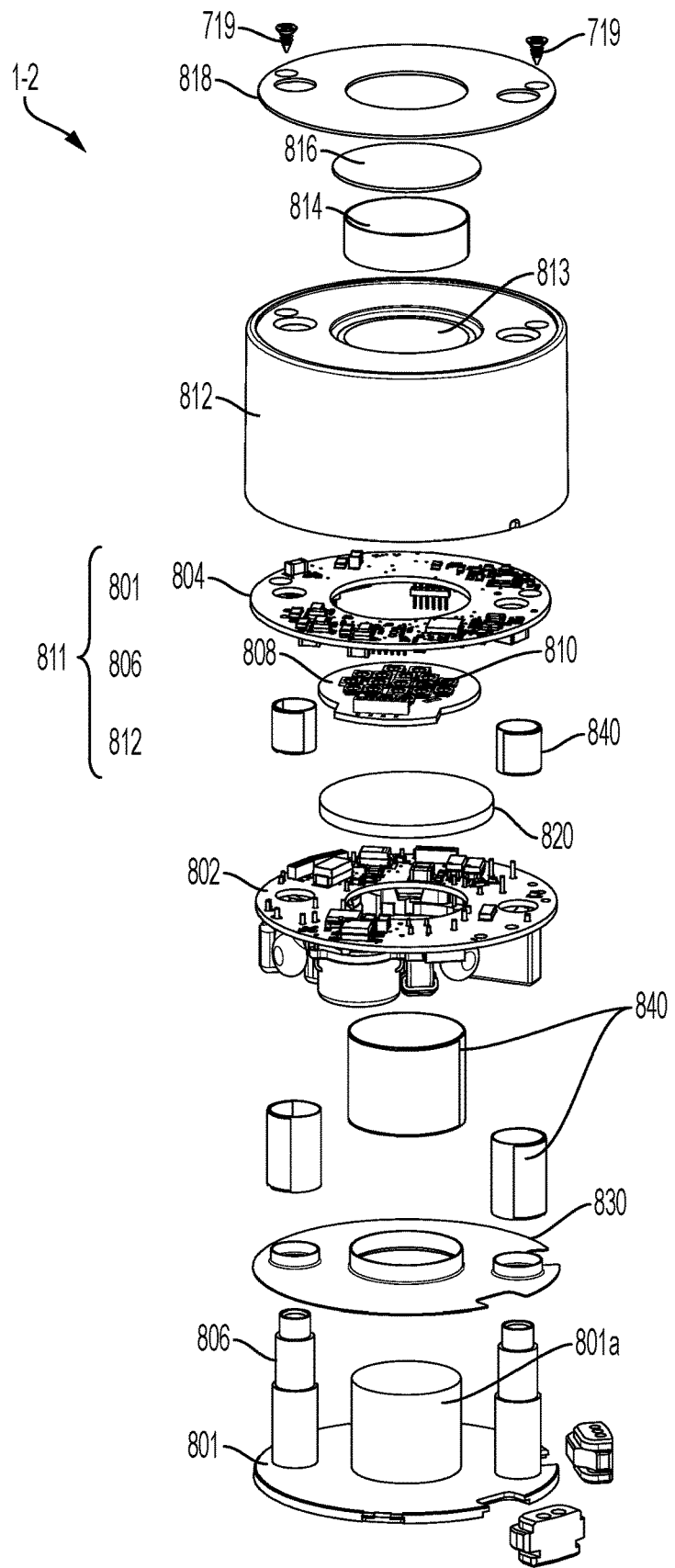
FIG. 8B illustrates an exploded perspective view of the lighting system, according to some embodiments of the present disclosure.
Figure 8C:
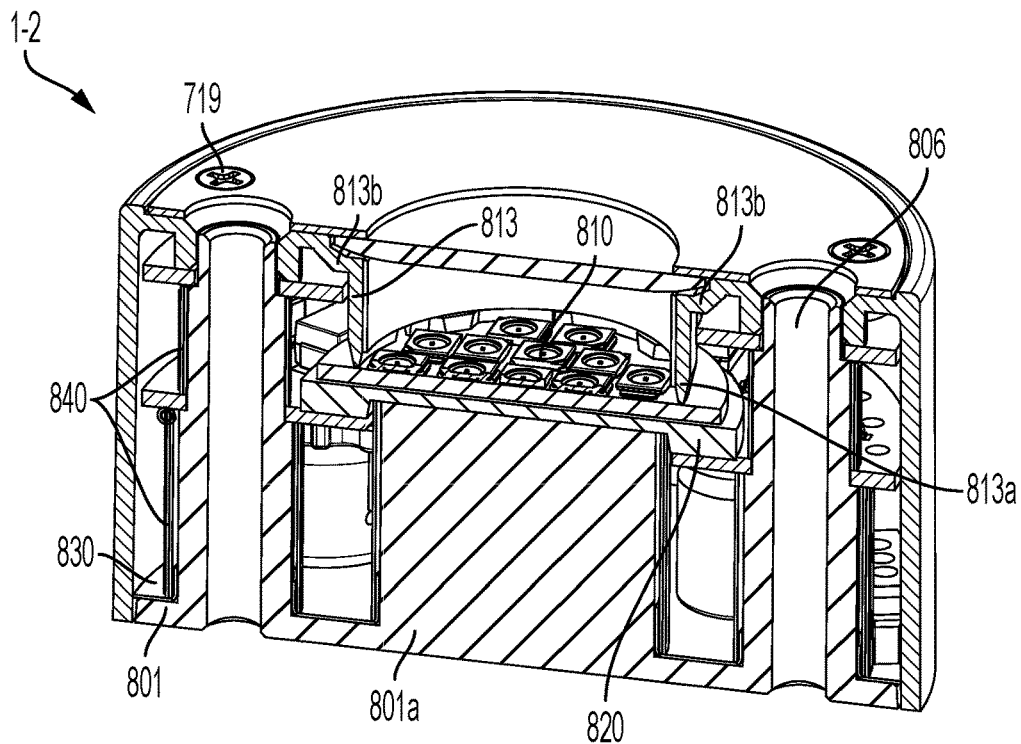
FIG. 8C illustrates a cutaway perspective view of the lighting system, according to some embodiments of the present disclosure.
Figure 8D:
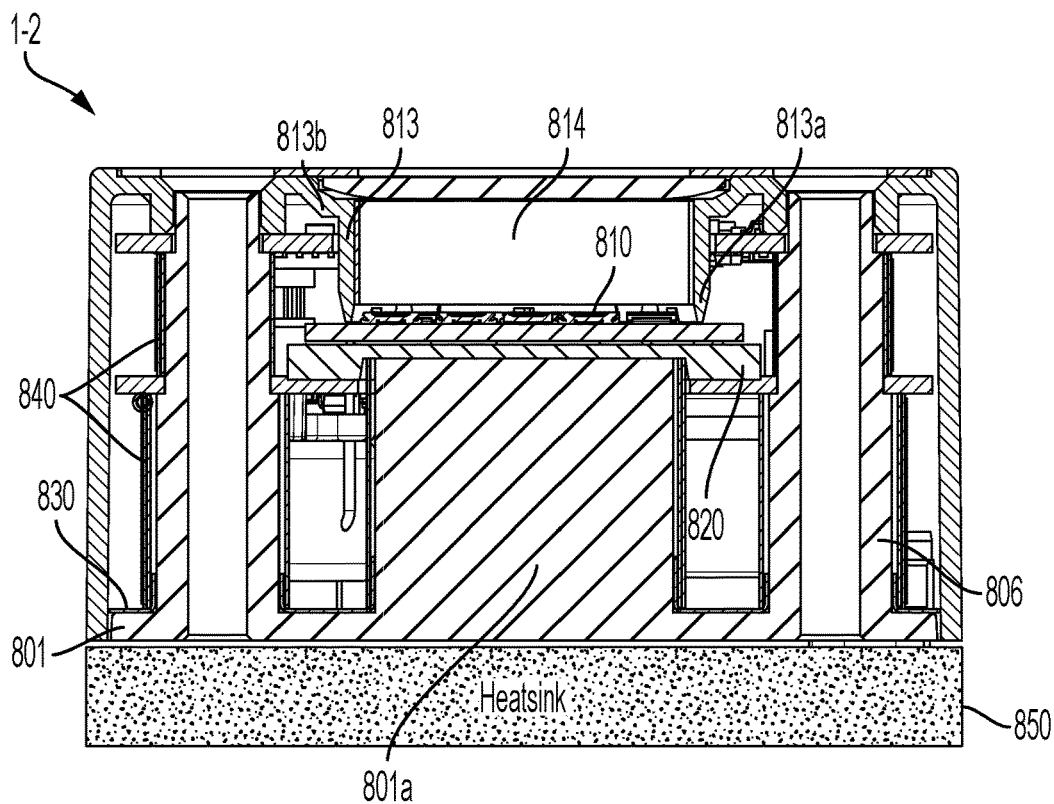
FIG. 8D illustrates a cross-sectional view of the lighting system, according to some embodiments of the present disclosure.
Figure 8E:
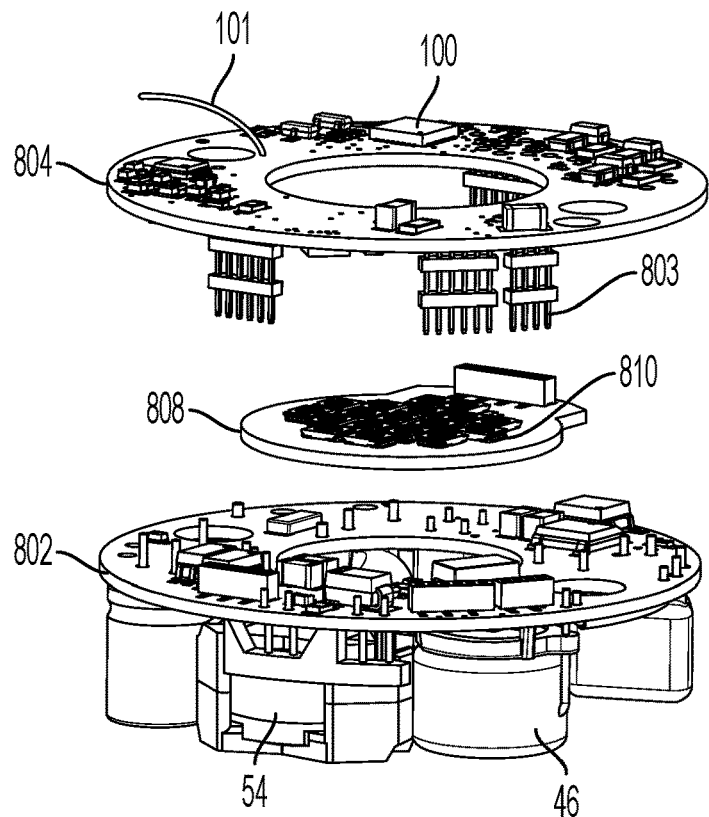
FIGS. 8E and 8F illustrate exploded perspective views of the layers of the lighting system on which the internal electrical components are mounted, according to some embodiments of the present disclosure.
Figure 8F:
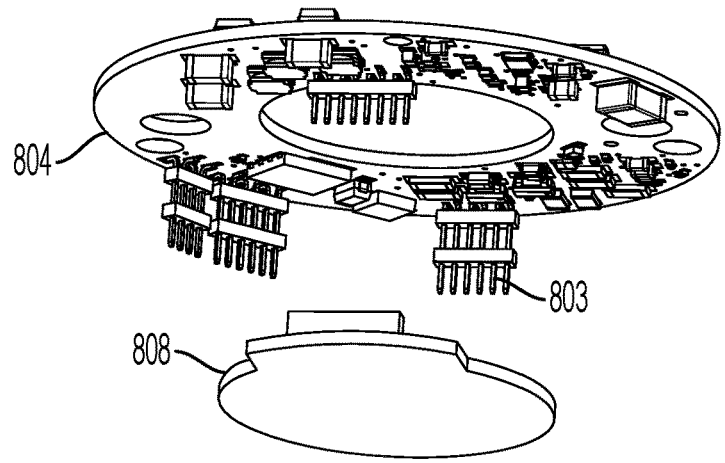
Figure 8G:
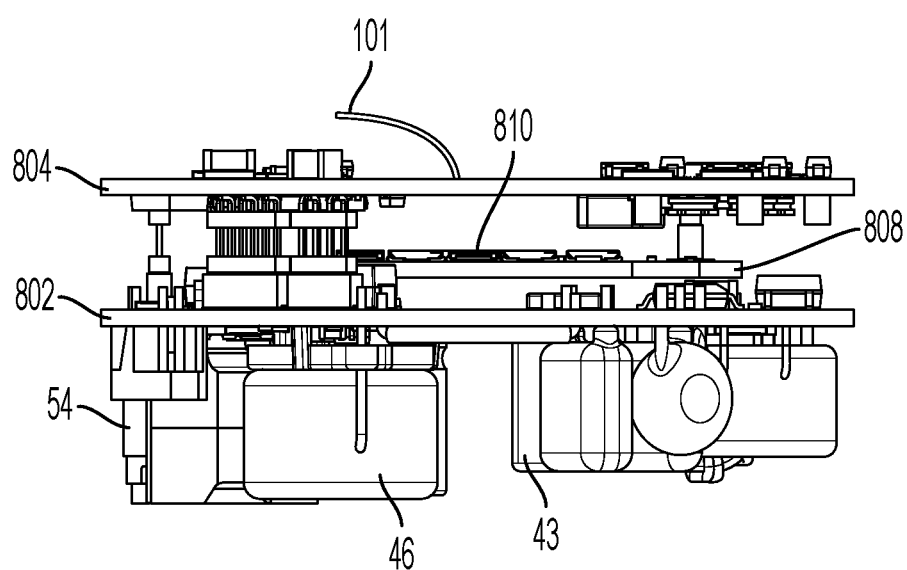
FIG. 8G illustrates a side view of the two layers of the lighting system, according to some embodiments of the present disclosure.

FIG. 8A illustrates a perspective view of the lighting system 1-2, according to some embodiments of the present disclosure. FIG. 8B illustrates an exploded perspective view of the lighting system 1-2, according to some embodiments of the present disclosure. FIG. 8C illustrates a cutaway perspective view of the lighting system 1-2, according to some embodiments of the present disclosure. FIG. 8D illustrates a cross-sectional view of the lighting system 1-2, according to some embodiments of the present disclosure. FIGS. 8E and 8F illustrate exploded perspective views of the layers of the lighting system 1-2 on which the internal electrical components are mounted, according to some embodiments of the present disclosure. FIG. 8G illustrates a side view of the two layers of the lighting system 1-2, according to some embodiments of the present disclosure.

The lighting system 1-2 may have many elements and features that are the same as, or substantially similar to, those of the lighting system 1-1. In the interest of brevity, the following description will mainly focus on differences between the lighting systems 1-1 and 1-2, and descriptions of common or substantially similar elements and features may not be repeated herein.

Referring to FIG. 8A, the lighting system 1-2 according to some embodiments is a tunable AC-input white LED engine having a wide light-emitting surface (LES) and high lumen output, which makes it suitable for general illumination applications. In some examples, the lighting system 1-2 may be a cylindrical light fixture having a diameter of about 50 mm. The flat top may have an aperture (e.g., a round lens) with an LES of about 19 mm. The light system 1-2 may be able to produce a light output of about 1200 lm. In some examples, the lighting system 1-2 may utilize 3-channel de-saturated (Fusion) LEDs to achieve precise blackbody line (BBL) tuning.

Referring to FIG. 8B, the lighting system 1-2 has a 3-layer structure including a first layer 802, a second layer 804 coupled to and vertically offset from the first layer 802 by two or more base posts 806, and a third layer 808 that is vertically offset from and coupled to the second layer 804. The layers 802, 804, and 808 may include PCBs having one or more layers (e.g., metal layers).

In some embodiments, the housing 811 of the lighting system 1-2 includes a heatsink base 801 at the bottom side/backside of the lighting system 1-2, which faces away from the layers 802, 804, and 808, and has a central pedestal (or pillar) structure 801a that protrudes from the heatsink base 801 toward the third layer 808. The heatsink base 801 and the pedestal (or pillar) structure 801a together form a heatsink for the light source 810 and components of the lighting system 1-2.

The base posts 806 may extend vertically from the heatsink base 801 to the top of the case cover 812 within the interior space of the housing 811. The base posts 806 may not only couple the case cover 812 to the heatsink base 801, but they also support the first and second layers 802 and 804 above the heatsink base 801 via one or more stepped portions at the exterior of the base posts 806. In some examples, the base posts 806 may have a hollow interior allowing a fastener to pass therethrough and couple the lighting system 1-2 to a heatsink mount (e.g., a fixture heatsink) 850, which may be a passive heat exchanger or an active heat exchanger (e.g., including a fan).

In some embodiments, the first and second layers 802 and 804 may be ring-shaped and have openings in theirs centers that allow the pedestal 801a to pass therethrough. The first and second layers 802 and 804 may be vertically offset from the heatsink base 801, thus allowing components to be mounted one both sides of each of the first and second layers 802 and 804.

In some embodiments, the integrated multi-layered lighting system 1-2 includes a light source 810 coupled to the third layer 808, which is supported by and is thermally connected to the heatsink pedestal 801a. The opening of the second layer 804, which is positioned above the third layer 808, allows for the light produced by the light source 810, which may include a plurality of light emitting diodes (LEDs), to pass through the second layer 804 without obstruction and to illuminate the target environment. The light source 810 may include one or more green LEDs of the green channel 20, one or more blue LEDs of the blue channel 22, and one or more red LEDs of the red channel 24. In some examples, the LEDs 810 are unsaturated LEDs, which serve to provide a more vibrant and consistent color to illuminated objects as compared to saturated LEDs.

The housing 811 also includes a case cover 812 that, together with the heatsink base 801, encompass/encase the components within the lighting system 1-2 and protects them from the elements. At its center, the case cover 812 may have an inner/inward extension portion 813 defining an opening (or a case/housing opening) that can act as a light tunnel directing light produced by the light source 810 to the outside. A reflector (e.g., metal reflector) 814 may be placed inside the case/housing opening to ensure that the light produced by the light source 810 is not absorbed by the interior walls of the case/housing opening, and thus improve (e.g., increase) the light extraction efficiency of the lighting system 1-2. The reflector 814 may rest on or contact the inner surface of the inner extension portion 813. The reflector 814 may have a cylindrical shape (as shown in FIGS. 8B-8D) or may be inwardly tapered. A glass lens 816 may fit within a notched portion 813b of the case/housing opening and be held in place above the light source 810 by a hold-down cap (e.g., a ring-shaped hold-down cap) 818 that is fastened (e.g., screwed) to the top of the case cover 812.

As the light source 810 may generate a lot of heat in the tightly confined space of the lighting fixture 1-1, thermal management is an important consideration. To improve the dissipation of heat generated by the light source 810, the third layer 808 that has the light source 810 mounted thereto is placed on top of the heatsink pedestal 801a, which is thermally and electrically conductive and channels/transfers the light source-generated heat to the heatsink base 801 and the outside (e.g., via the heatsink mount/fixture 850). In some examples, a thermal conductivity pad 820 may fill the gap between the light source 810 and the top surface of the conductive (and grounded) pedestal 801a. The thicker the thermal pad 820, the lower the resistance between the back of the light source (e.g., the LEDs) 810 and the pedestal 801a. In some examples, the thermal padding 820 may be about 2 mm thick, which is significantly thicker than the micron separation between the traces and the metal plate of the solution of the embodiments of FIGS. 7A-7H (substrate solution). Therefore, any capacitance resulting from the presence of the thermal pad 820, which is electrically insulative, between conductive pedestal 801a and the metal backing of the light source (e.g., the LEDs) 810 is very small (as compared to the capacitance resulting from the metal backing and micron-thick insulation in the first layer 702), and does not affect the operation of the circuitry of the lighting system 1-2. In other words, the noise generated by the system 1-2 (e.g., the primary switch 53) does not have a meaningful path to safety ground. As such, the design of the embodiments of FIGS. 8A-8G does not need the decoupling capacitor 720 to decouple the safety ground of the heatsink structure and driver ground, which was discussed above with respect to FIGS. 7A-7H.

In some embodiments, two or more of the heatsink base 801, the pedestal structure 801b, and the one or more posts 806 are monolithically formed out of a same material. For example, the heatsink base 801 and pedestal structure 801a may be cast out of the same material and may form a single integrated/monolithic heatsink structure; however, embodiments of the present disclosure are not limited thereto. For example, one or more of the heatsink base 801, the pedestal structure 801a, and the one or more posts 806 may be separately formed (e.g., separately cast) and fixed together (e.g., via welding or a fastening mechanism). In some examples, the heatsink 801 and 801a may be made of copper, aluminum, or any other suitable material that is sufficiently electrically and thermally conductive.

The metal heatsink base 801 may extend continuously or substantially continuously across the bottom surface of the lighting system 1-2, and the pedestal 801a may have a sufficient diameter to maintain the temperature of the light source 810 at a desired temperature range of, for example, about 30° C. to about 40° C. Without the heat sink properties of the metal core layer 106, the LEDs 810 may operate at significantly higher temperatures (e.g., about 20° C. to 30° C. higher), which could lead to a change in the LED characteristics and to an undesirable change in the color and intensity of the light output of the lighting system 1-2. The heatsink structure 801 and 801a may also act as the safety ground of the lighting system 1-2.

In some examples, the base post 806 may be cast out of the same material as the heatsink structure 801 and 801a and may form a monolithic structure therewith. However, embodiments of the present disclosure are not limited thereto, and for example, the base posts 806 may be separately formed and then fastened to the heatsink structure 801 and 801a.

In addition to acting as a heatsink, the pedestal 801a positions the light source 810 closer to the round aperture 816, which allows the lighting system 1-2 to improve light extraction efficiency and to achieve a target 100 lumens/watt out of the small aperture. The pedestal structure 801a may slightly increase thermal resistance from the back of the light source 810 to the back plate. Therefore, in some examples, to compensate for this added thermal resistance and to maximize heat transfer from the light source 810 to the back surface of the heatsink base 801, copper may be used as the casting material, as it has higher thermal conductivity than aluminum.

In some embodiments, one of more components of at least one of the power supply 50 and one or more components of the light driver 30 are mounted on at least an underside of the first layer 802 facing the heatsink base 801. Further, one of more components of at least one of the power supply 50 or the light driver 30 are mounted on a top side of the first layer 802 facing away from the heatsink base 801. Similarly, one of more components of at least one of the power supply 50 or the light driver 30 are mounted on an underside of the second layer 804 facing the first layer 802, one of more components of at least one of the power supply 50 or the light driver 30 are mounted on a top side of the second layer 804 facing away from the first layer 802.

In some examples, the components mounted to the first layer 802 may be the same or substantially the same as those mounted to the second layer 704, and the components mounted to the second layer 804 may be the same or substantially the same as those mounted to the first layer 702, with the exception of the light source 810. However, because of the additional real estate resulting from being able to mount components to both sides of the second layer 804, in some examples, the primary switch 53 as well as other small components may be mounted to the second layer 804. This may be illustrated more clearly in FIGS. 8E-8G. In some examples, the antenna 101 may be mounted on the same layer as the channel controller 100, that is, the second layer 804, as shown in FIGS. 8E and 8G.

As shown, in some examples, the second components mounted on the first to third layers 802, 804, and 808 may be electrically connected to one another through one or more electrical connectors/links 803.

As the base posts 806 are safety grounded, it is desirable to insulate the posts 806 from the rest of the lighting system circuit. Therefore, in some embodiments, a base insulator 830 is placed above the heatsink base 801 and one or more rolled insulators 840 may be positioned around different sections of the vertical base posts 806 to insulate the safety-grounded heatsink (801, 801a, and 806) from the electrical components of the lighting system 1-2. The base insulator 830 may have openings therethrough to correspond to the pedestal 801a and the two base posts 806 and may have circular protrusions that cover the bottom portion of the side surfaces of the pedestal 801a and the two base posts 806. The rolled insulators 840 may be secured to the pedestal 801a and the two base posts 806 by tape, sonic welding, heat welding, vacuum sealing, or any other suitable mechanism. The base insulator 830 and the rolled insulators 840 may be made of high voltage resistant, high temperature resistant (and, e.g., self-extinguishing), and electrically insulative material. The material may also be thermally conductive to improve heat dissipation through the heatsink (801, 801a, and 806). However, embodiments of the present disclosure are not limited thereto. For example, the housing 811 may include insulated post covers (e.g., plastic post covers) that cover and insulate the base posts 806 and pedestal 801a, and prevent other electrical components from making physical and electrical contact with these elements.

In some examples, the first and second layers 802 and 804 may have a ring shape. Further, the first and second layers 802 and 804 may have the same or substantially the same diameter; however, embodiments of the present disclosure are not limited thereto, and the first and second layers 802 and 804 may have any suitable shape and size to fit within an existing wall fixture. For example, as shown in FIGS. 8B-G, the first and second layers 802 and 804 overlap one another in a plan view. Further, the third layer 808 partially overlaps the first and second layers 802 and 804 in a plan view (e.g., outer edges of the third layer 808 may overlap inner edges of the first and second layers 802 and 804 in a plan view).

Figure 9A:
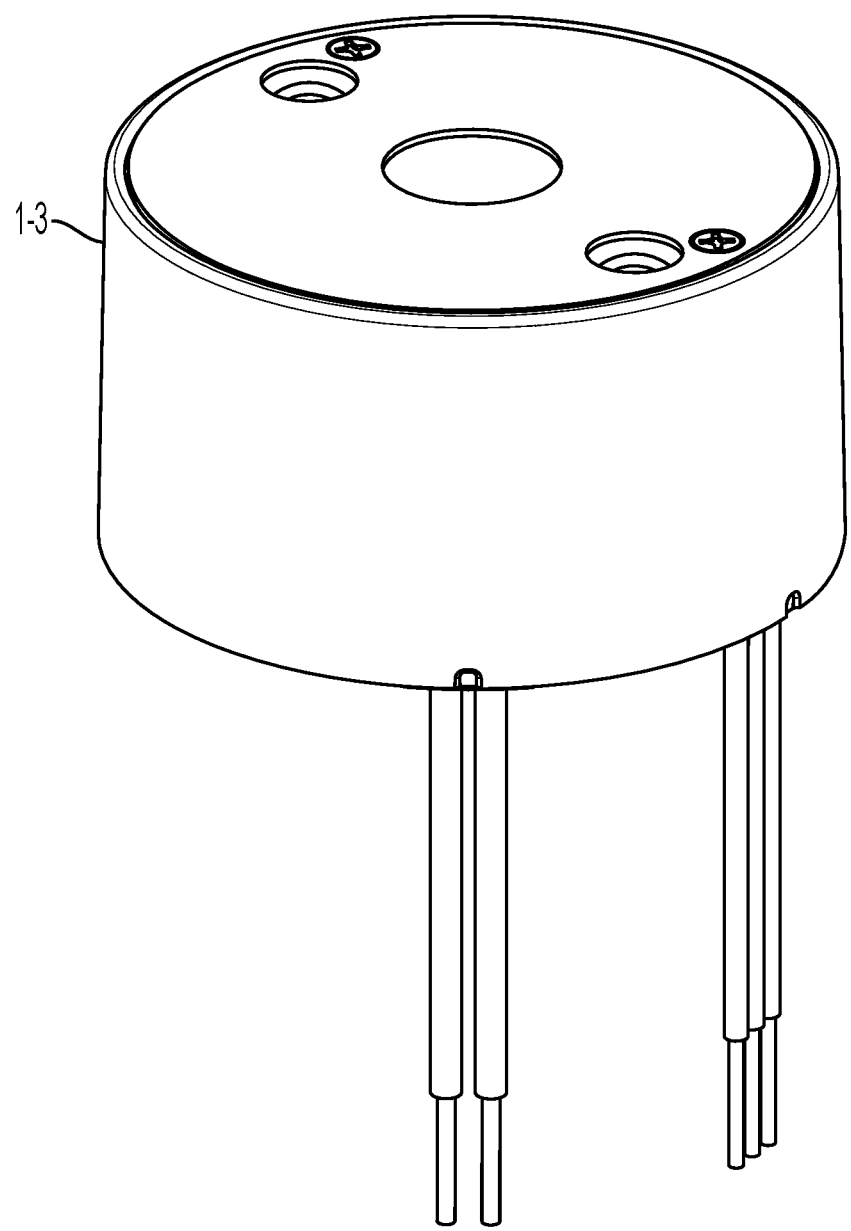
FIG. 9A illustrates a perspective view of a lighting system, according to some embodiments of the present disclosure.
Figure 9B:
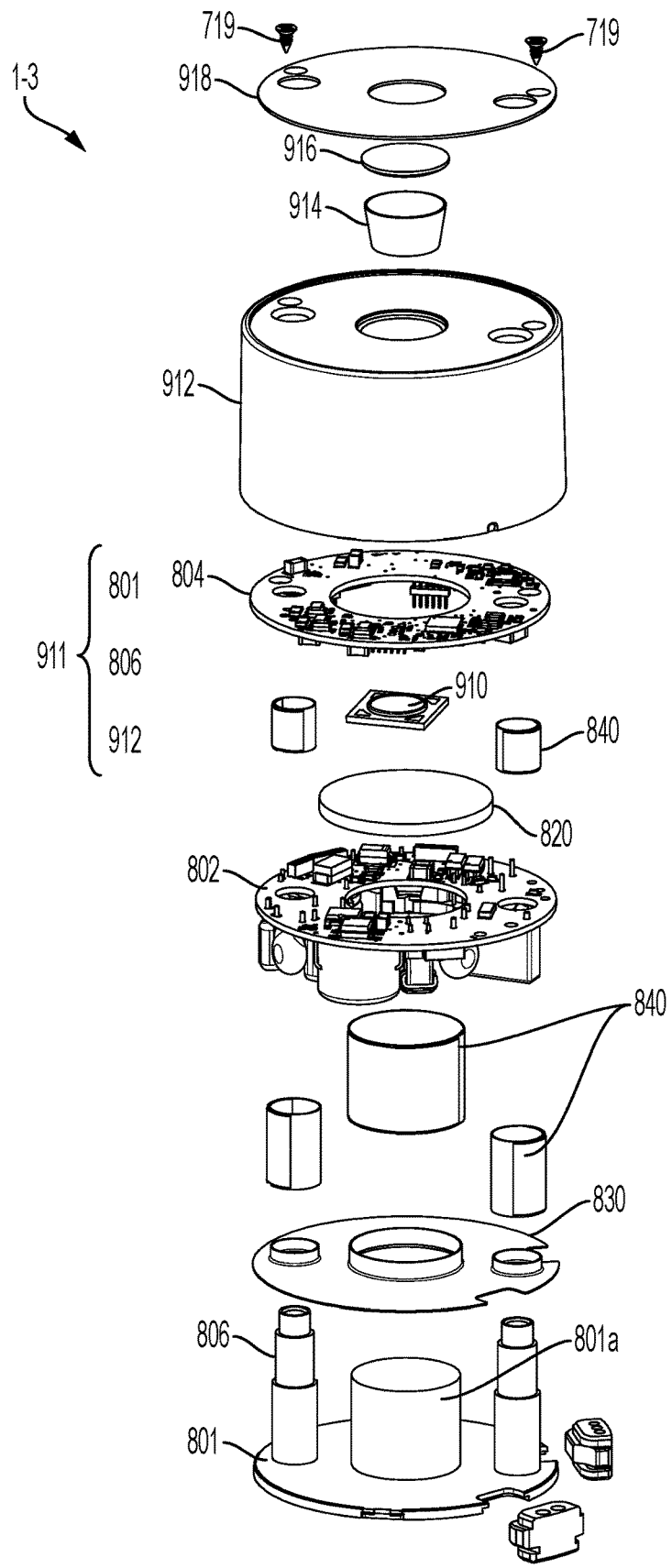
FIG. 9B illustrates an exploded perspective view of the lighting system, according to some embodiments of the present disclosure.
Figure 9C:
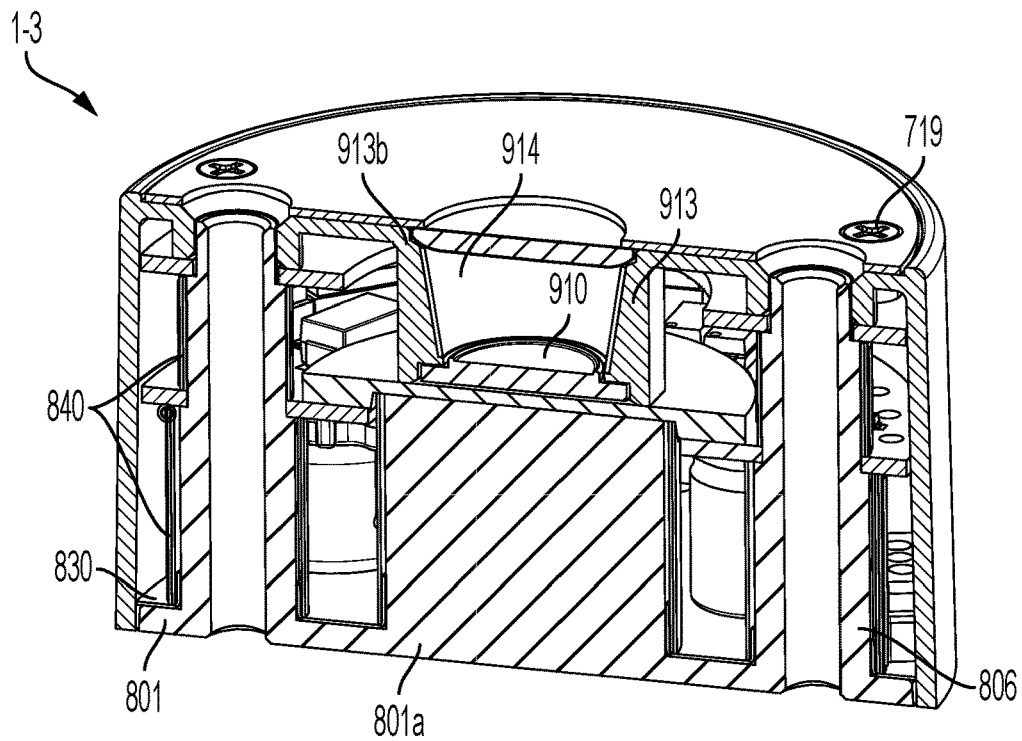
FIG. 9C illustrates a cutaway perspective view of the lighting system, according to some embodiments of the present disclosure.
Figure 9D:
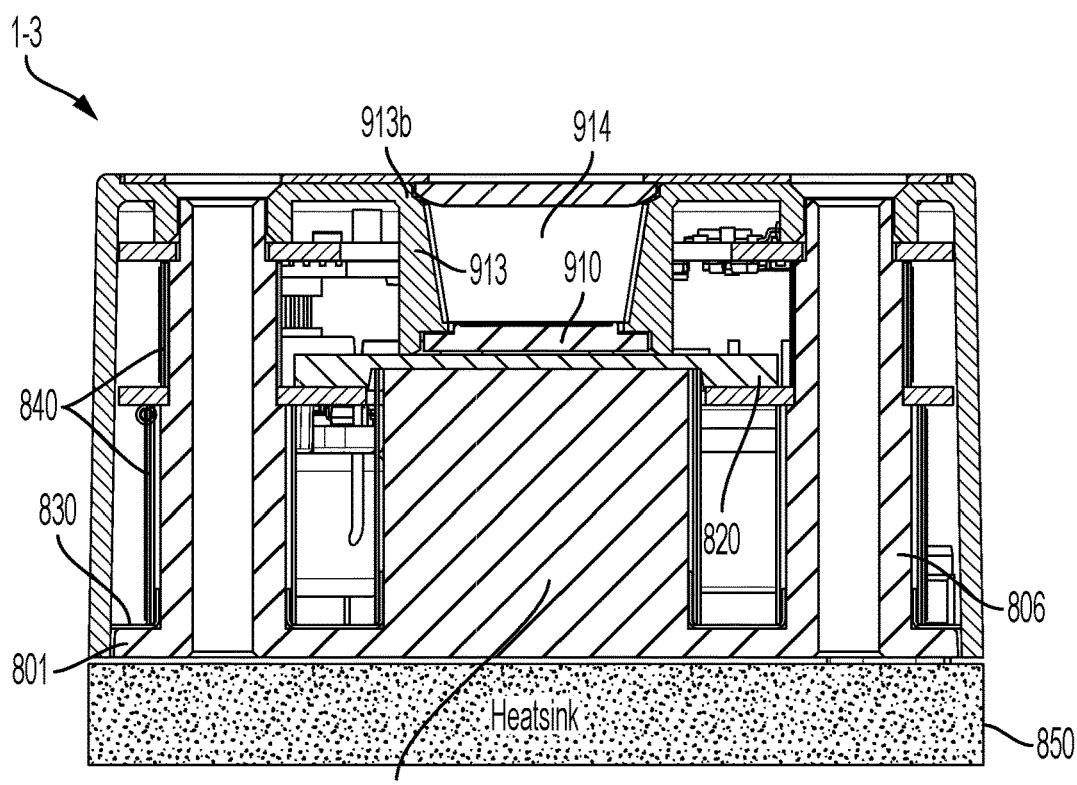
FIG. 9D illustrates a cross-sectional view of the lighting system, according to some embodiments of the present disclosure.
Figure 9E:
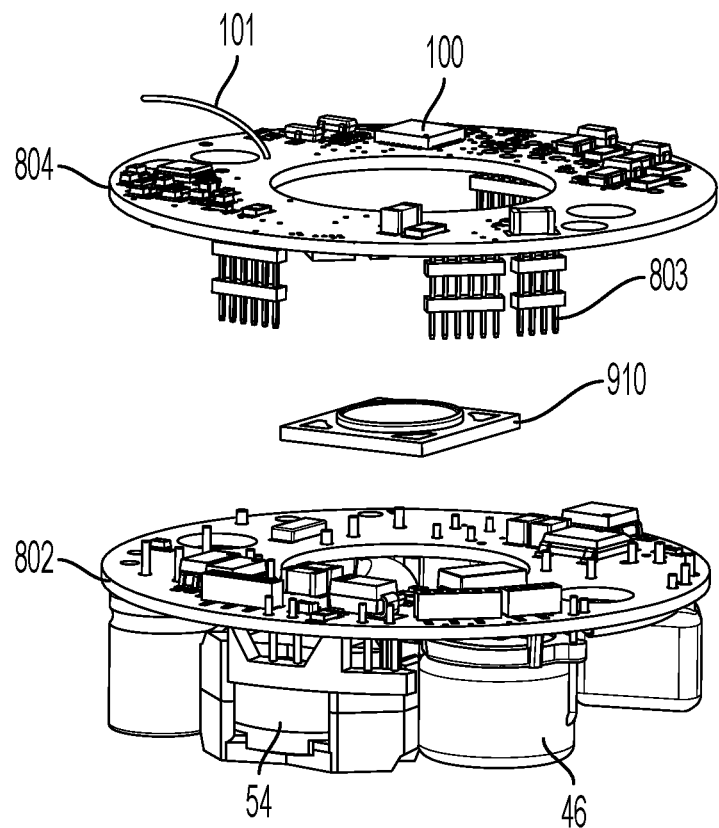
FIGS. 9E and 9F illustrate an exploded perspective view of the layers of the lighting system on which the internal electrical components are mounted to, according to some embodiments of the present disclosure.
Figure 9F:
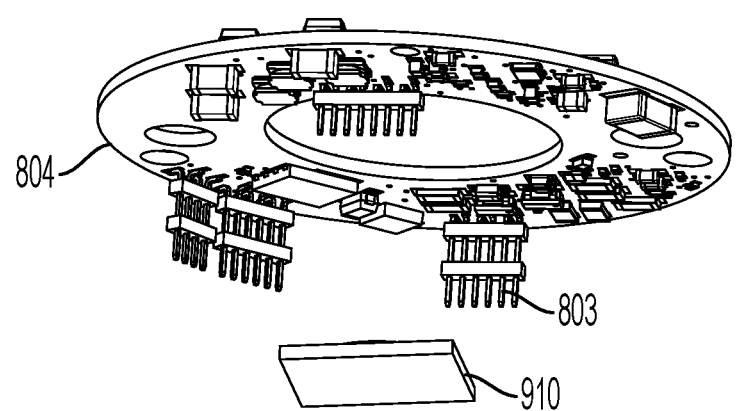
Figure 9G:
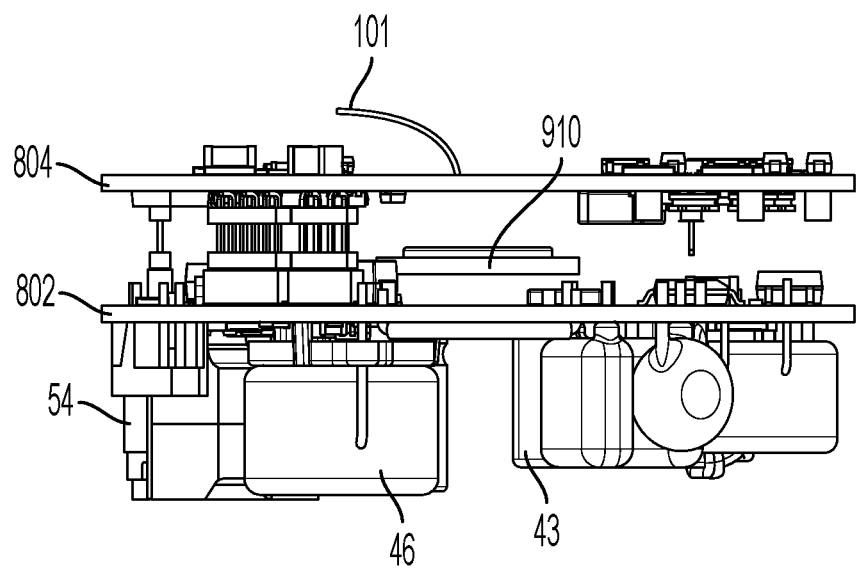
FIG. 9G illustrates a partial side view of the layers of the lighting system, according to some embodiments of the present disclosure.

FIG. 9A illustrates a perspective view of the lighting system 1-3, according to some embodiments of the present disclosure. FIG. 9B illustrates an exploded perspective view of the lighting system 1-3, according to some embodiments of the present disclosure. FIG. 9C illustrates a cutaway perspective view of the lighting system 1-3, according to some embodiments of the present disclosure. FIG. 9D illustrates a cross-sectional view of the lighting system 1-3, according to some embodiments of the present disclosure. FIGS. 9E and 9F illustrate an exploded perspective view of the layers of the lighting system 1-3 on which the internal electrical components are mounted to, according to some embodiments of the present disclosure. FIG. 9G illustrates a partial side view of the layers of the lighting system 1-3, according to some embodiments of the present disclosure.

The lighting system 1-3 may have many elements and features that are the same as, or substantially similar to, those of the lighting system 1-2. In the interest of brevity, the description of lighting system 1-3 will mainly focus on differences between the lighting systems 1-2 and 1-3, and descriptions of common or substantially similar elements and features may not be repeated.

Referring to FIG. 9A, the lighting system 1-3 is a static white AC-input LED engine having a narrow light-emitting surface (LES) and high lumen output. In some examples, the lighting system 1-2 may be a cylindrical light fixture having a diameter of about 50 mm. The flat top may have an aperture (e.g., a round lens) with an LES of about 9 mm or 12 mm. The light system 1-3 may be able to produce a light output of about 1500 lm. In some examples, the lighting system 1-3 may utilize a single CCT COB to achieve narrower LES and higher lumen output. It may provide high lumens per watt (LPW) but with no white tuning.

The internal structure of the lighting system 1-3 may be substantially the same as that of the lighting system 1-2 with some exceptions. For example, instead of using a third layer 808 with surface mounted LEDs 810, the lighting system 103 utilizes a COB (e.g., a single CCT COB) 910, which is supported by the pedestal 801a. A thermal gap pad 820 may also fill the gap between the pedestal 801a and the COB 910. One or more of the first and second layers 802 and 804 may have wired connections to the COB 910.

In some embodiments, the case cover 912 of the housing 911 may have an inner/inward extension portion 913 that is inwardly tapered and serves to center and secure COB 910. The reflector 914 may conform to the shape of the inner/inward extension portion 913 and may be held in place by the lens (e.g., a glass lens) 916, which may fit within the a peripheral notch (or stepped portion) 913b of the case cover 912. The lens 916 may be held in place above the COB 910 by a cap (e.g., a ring-shaped hold-down cap) 918 that is configured to be fixedly attached to (e.g., fastened or screwed to) the top of the case cover 912, for example, via one or more screws 719.

The design of the lighting system 1-3 allows for the COB 910 to be swapped out with any single color array, full-color array, or any other suitable LED array. This change may be accomplished by using the same light engine and simply making suitable modifications to the channel controller firmware. This adds significant versatility to the design of the lighting system 1-3.

Accordingly, as described above, the multi-tiered design of the lighting system 1-2/1-3 provides additional surface area to mount the various components of the light driver 30 in the vertical direction, which allows the lighting system 1-2/1-3 to have a more compact design with a smaller footprint, as compared to designs of the related art.

Figure 10:
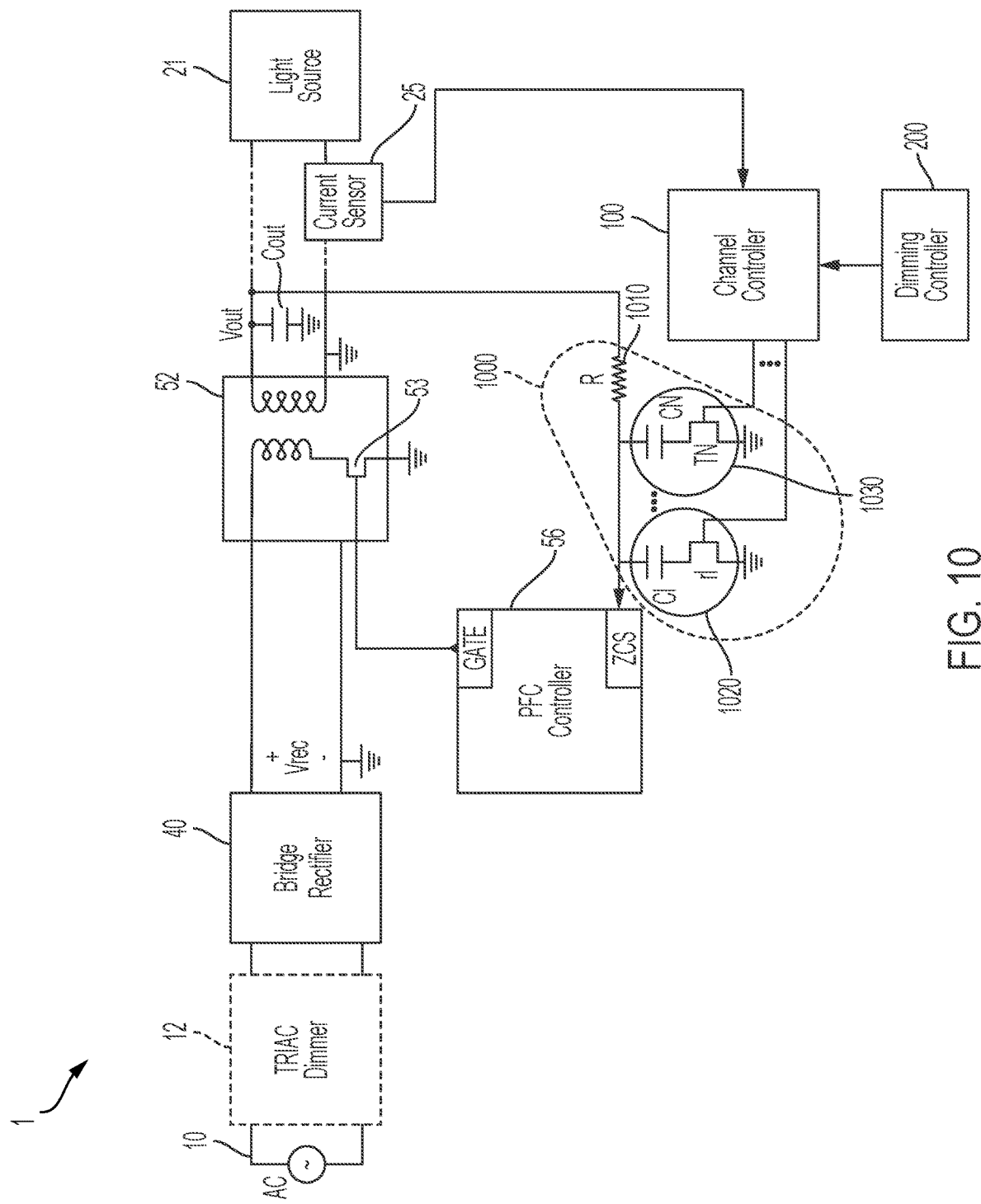
FIG. 10 is a block diagram illustrating a lighting system with a PFC controller utilizing a zero-crossing delay circuit, according to some embodiments of the present disclosure.

FIG. 10 is a block diagram illustrating a lighting system 1 with a PFC controller utilizing a zero-crossing delay circuit 1000, according to some embodiments of the present disclosure.

According to some embodiments, the lighting system 1 includes the converter 52, the PFC controller 56, the channel controller 100, and a zero-crossing delay circuit 1000. The converter 52 receives the rectified input voltage Vrec from the rectifier 40 and generates an output voltage Vout based on a gate control signal $V_{GATE}$ from the PFC controller 56. The gate control signal $V_{GATE}$ is supplied by the control output port (e.g., a control output terminal/pin) GATE of the PFC controller 56, and controls the output voltage Vout of the converter 52 by controlling the on/off state of the driving switch 53 (also referred to as a main or primary switch) of the converter 52. In some examples, the driving switch 53 may be a field effect transistor (FET, such as a metal-oxide FET (MOSFET)); however, embodiments of the present disclosure are not limited thereto, and any suitable switch may be utilized.

The PFC controller 56 monitors (e.g., continuously monitors) the zero-crossing voltage at its zero-crossing input (e.g., a zero-crossing input terminal/port/pin) ZCS and generates the gate control signal $V_{GATE}$ to adjust the level of the output voltage Vout based on this zero-crossing voltage. When the zero-crossing input ZCS is held at a first state (e.g., held high), the PFC controller 56 may deactivate (e.g., turn off) the driving switch 53 (e.g., by disabling the gate drive operation of the PFC controller 56) and thus cause the output voltage Vout of the converter 52 to drop. When the zero-crossing input ZCS is in a second state (e.g., is held low, is released, or becomes an open connection), the PFC controller 70 may resume normal operation and provide the gate control signal $V_{GATE}$ to the driving switch 53 to regulate the output voltage Vout.

In some embodiments, the PFC controller 56 monitors the zero-crossing voltage, and in response to it being above a zero-crossing threshold, the PFC controller 56 generates the gate control signal $V_{GATE}$ to repeatedly turn on and off the driving switch 53 of the converter until the output voltage Vout reaches a desired level; and, in response to the zero-crossing voltage being less than or equal to the zero-crossing threshold, the PFC controller is configured to deactivate the driving switch 53 (e.g., by disabling the gate drive operation of the PFC controller 56) to allow the output voltage Vout to drop.

In some embodiments, the lighting system 1 includes a zero-crossing delay circuit 1000 that is coupled between an output of the converter 52 and the zero-crossing input ZCS of the PFC controller 56, and is configured to slow down the rate of change of the zero-crossing voltage according to on one or more delay control signals that it receives from the channel controller 100. Thus, the zero-crossing delay circuit 1000 may prolong the off-time of driving switch 53 in response to the one or more delay control signals.

The channel controller 100, in turn, identifies whether the lighting system 1 is in a low-load state (e.g., a stand-by state), and if so transmits the one or more delay control signals to the zero-crossing delay circuit 1000. In some embodiments, the channel controller 100 is configured to detect the load current of the converter 52, for example via the current sensor 25, and to identify the low-load state of the lighting system 1 based on the load current being below a current threshold. The current sensor may sense the output current of the converter 52 by utilizing an in-line sense resistor, a hall-effect sensor, and/or the like. In some examples, the channel controller 100 may also identify the low-load state of the lighting system 1 based on a dimmer level set by an external dimmer, such as a TRIAC or 0-10V dimmer 12 at the input 10 or a wireless dimmer that is communicatively coupled to the channel controller 100 through a dimming controller 200. For example, when a user sets the dimmer to a low setting (e.g., lowest dimmer setting), the channel controller determines that the lighting system 1 is in a low-load state.

In the related art, the PFC controller adjusts the switching frequency of the driving switch 53 by varying the on-time of the gate control signal, while maintaining a fixed off-time for the gate control signal.

According to some embodiments, by selectively holding the zero-crossing input ZCS in the first state (e.g., a low-voltage state) to turn off or prolong the off-time of the PFC controller 56, the zero-crossing delay circuit 1000 can increase the off-time of the gate control signal $V_{GATE}$ in response to one or more delay control signals from the channel controller 100. In some embodiments, depending on the desired output voltage Vout for the converter 52, the zero-crossing delay circuit 1000 maintains the PFC controller 56 at the first state to prolong the off-time of the main switch 53 of the converter 52 and thus effectively lower the switching frequency of the main switch 53. This may allow a much wider output operating range (e.g., higher dynamic range) for the lighting system 1, while still remaining within electromagnetic compliance (EMC) limits for power factor and total harmonic distortion.

In some embodiments, the zero-crossing delay circuit 1000 includes a resistor 1010 (R) coupled between the output of the converter 52 and the zero-crossing input ZCS, and a first switchable delay circuit 1020 switchably coupled between the zero-crossing input ZCS and a reference ground (e.g., the electrical ground of the lighting system 1), which is configured to delay change in the zero-crossing voltage in response to a first delay control signal of the one or more delay control signals. The resistor 1010 (R) couples the zero-crossing input ZCS to the output of the converter 52, and enables the zero-crossing voltage to be pull-up by the output voltage Vout. When the output voltage Vout is low and below the desired level, the PFC controller 56 is on and controls the switching of the primary switch 53 to increase the output voltage Vout to the desired level. When the output voltage Vout is high and higher than the desired voltage, the PFC controller 56 disables its gate drive operation and causes the primary switch 53 to be deactivated, which leads to a decrease in the output voltage Vout until it reaches the desired level.

In some embodiments, the first switchable delay circuit 1020 includes a first capacitor C1 and a first switch T1 coupled together in series between the zero-crossing input ZCS and the reference ground. The first switch T1 may be transistor, such as a FET (e.g., an N-channel Metal-oxide Semiconductor (NMOS) or a P-channel Metal-oxide Semiconductor (PMOS)) or the like, which includes a first gate electrode communicatively coupled to the channel controller 100 (e.g., to an output of the channel controller 100). The first switch T1 is configured to activate (e.g., turn on) and capacitively couple the zero-crossing input ZCS to the reference ground via the first capacitor in response to receiving the first delay control signal from the channel controller 100 at the first gate electrode. The first switch T1 is also configured to deactivate (e.g., turn off) and decouple the zero-crossing input ZCS from the first capacitor C1 in an absence of the first delay control signal at the first gate electrode.

As shown in FIG. 10, the first capacitor C1 may be coupled between the zero-crossing input ZCS and the first switch T1, and the first switch T1 may be coupled between the first capacitor C1 and the reference ground. However, the connection order of the first capacitor C1 and the first switch T1 may be reversed. In some examples, the capacitance of the first capacitor C1 may be about 47 µF and a resistance of the resistor 1010 is about 50 kΩ; however, this is merely as example, and the capacitance and resistance may have any suitable value.

When switched in (e.g., when the first switch T1 is activated), the first capacitor C1 is charged by the converter output, and the charge therein can slow the reduction of voltage at the zero-crossing input ZCS at a later time. This delays when the zero crossing is seen by the zero-crossing input ZCS, which changes (e.g., increases) the off-time of the PFC controller 56 and thus the gate control signal $V_{GATE}$.

In the related art, when operating at low load conditions, the PFC controller may struggle to deliver such loads. For example, the PFC controller may either deliver a high load by entering burst mode, or no load at all by being turned off. In burst mode, the PFC controller exhibits a variable off time that ranges from very low off time to very high off time, which can lead to observable flicker in the light output of the light source.

According to some embodiments, when the channel controller 100 determines that the lighting system 1 is operating in a low-load condition (e.g., in a low-power standby mode), it activates the first switch T1 thus switching in (e.g., electrically connecting) the first capacitor C1. This causes the PFC controller 56 and the gate control signal $V_{GATE}$ to have a longer off time (b/c voltage stays high for longer) by a set amount, which lowers the effective switching frequency of the driving switch 53. This allows the lighting system 1 to achieve lower load levels without entering burst mode (i.e., without using alternating on-off time), which eliminates or substantially reduces visible flicker at the light output of the light source 21. When the channel controller 100 determines that the lighting system 1 is not operating in low load conditions (e.g., when operating in high load conditions), it deactivates the first switch T1, thus electrically disconnecting the first capacitor C1 from the PFC controller 56. This reduces the off time of the PFC controller 56 and the gate control signal $V_{GATE}$, which allows the converter 52 to produce the higher output current. This in effect increases the dynamic range of the lighting system 1, as it can achieve low load levels by disabling the gate drive operation of the PFC controller 56 and can achieve high load levels by removing the grounded capacitor C1 from the zero-crossing input ZCS.

In some embodiments, the channel controller 100 has granular control over the adjustment of off time of the gate control signal $V_{GATE}$. The zero-crossing delay circuit 1000 may include N different switchable delay circuits (N being an integer greater than 1) with capacitors that can be individually switched in to the zero-crossing input ZCS via N different corresponding switches.

For example, as shown in FIG. 10, the zero-crossing delay circuit 1000 may further include a second switchable delay circuit 1030 that may be substantially similar to the first switchable delay circuit 1020. That is, the second switchable delay circuit 1030 may also be switchably coupled between the zero-crossing input ZCS and the reference ground, and be configured to delay change in the zero-crossing voltage in response to a second delay control signal of the one or more delay control signals. While FIG. 10 illustrates an examples of two switchable delay circuits 1030, embodiments of the present disclosure are not limited thereto, and any suitable number such parallel-connected circuits may be employed.

The capacitors C1 to CN may have the same capacitance, or may have different capacitances that provide the channel controller 100 a finer discretized control over the off-time of the gate control signal $V_{GATE}$.

In the examples of FIG. 10, the switches T1 to TN are illustrated as NMOS transistors; however, embodiments of the present disclosure are not limited thereto and any suitable transistor or switch (e.g., mechanical switch) may be utilized.

The various components that were described with reference to FIG. 10, such as the dimmer 12, the light source 21, the rectifier 40, the converter 52, the PFC controller 56, the channel controller 100, and the dimming controller 200, are further described above with reference to FIGS. 1-9G. Thus, for the sake of brevity, their further descriptions may not be repeated here. The light source 21 may include one or more of the color channels 20, 22, and 24, or be any one of the light sources 710, 810, or 910.

Figure 11:
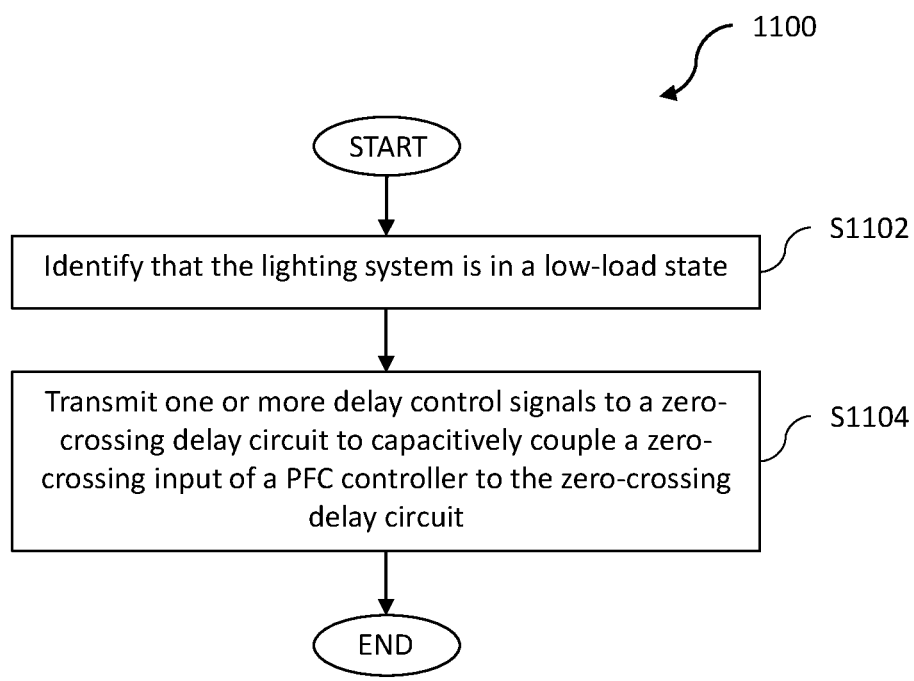
FIG. 11 illustrates the process of reducing power consumption during a low-load state of a lighting system, according to some embodiments of the present disclosure.

FIG. 11 illustrates the process 1100 of reducing power consumption during a low-load state of a lighting system, according to some embodiments of the present disclosure.

In some embodiments, the channel controller 100 of the lighting system 1 identifies that the lighting system 1 is in a low-load state (S1102), and transmits one or more delay control signals to the zero-crossing delay circuit 1000 to capacitively couple the zero-crossing input ZCS to the zero-crossing delay circuit (S1104). Here, the lighting system 1 includes the converter 52 that is configured to receive a rectified input voltage Vrec and to generate an output voltage based on a gate control signal; the PFC controller 56, which is configured to generate the gate control signal to adjust the output voltage of the converter based on a zero-crossing voltage at the zero-crossing input; and the zero-crossing delay circuit 1000, which is coupled between an output of the converter and the zero-crossing input, and is configured to slow a rate of change of the zero-crossing voltage based on the one or more delay control signals.

As described above, the zero-crossing delay circuit 1000 utilizes the channel controller 100 to determine when the lighting system is operating in low-load conditions, and to increase the off-time of the PFC controller 56, thus lowering the effective switching frequency of the converter 52 and reducing the output current of the lighting system. This allows the lighting system to have a wide-ranging output. This may also result in improved EMI performance at low power due to maintaining the frequency low with longer off-times. Further, the zero-crossing delay circuit 1000 may eliminate the need for complicated analog circuitry for zero crossing control and instead uses an already available output pin of the microprocessor of the channel controller to achieve a low cost, low complexity, and compact solution.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

As used herein, the term "and/or" includes any and all combinations of one or more of the associated listed items. For example, the expression "A and/or B" denotes A, B, or A and B. Expressions such as "one or more of" and "at least one of," when preceding a list of elements, modify the entire list of elements and do not modify the individual elements of the list. For example, the expression "one or more of A, B, and C," "at least one of A, B, or C," "at least one of A, B, and C," and "at least one selected from the group consisting of A, B, and C" indicates only A, only B, only C, both A and B, both A and C, both B and C, or all of A, B, and C.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the terms "substantially", "about", and similar terms are used as terms of approximation and not as terms of degree, and are intended to account for the inherent variations in measured or calculated values that would be recognized by those of ordinary skill in the art.

As used herein, the terms "use", "using", and "used" may be considered synonymous with the terms "utilize", "utilizing", and "utilized", respectively.

The integrated multi-layered lighting system and/or any other relevant devices or components, such as the channel controller, according to some embodiments of the present invention described herein may be implemented by utilizing any suitable hardware, firmware (e.g., an application-specific integrated circuit), software, or a suitable combination of software, firmware, and hardware. For example, the various components of the independent multi-source display device may be formed on one integrated circuit (IC) chip or on separate IC chips. Further, the various components of the LED driver may be implemented on a flexible printed circuit film, a tape carrier package (TCP), a printed circuit board (PCB), or formed on the same substrate. Further, the various components of the LED driver may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A lighting system comprising:
    a converter configured to receive a rectified input voltage and to generate an output voltage based on a gate control signal;
    a power-factor-correction (PFC) controller comprising a zero-crossing input, and configured to generate the gate control signal to adjust the output voltage of the converter based on a zero-crossing voltage at the zero-crossing input;
    a zero-crossing delay circuit coupled between an output of the converter and the zero-crossing input, and configured to slow a rate of change of the zero-crossing voltage based on one or more delay control signals; and
    a channel controller configured to identify a low-load state of the lighting system, and, in response, to generate the one or more delay control signals.

2. The lighting system of claim 1, wherein the low-load state comprises a stand-by state of the lighting system.

3. The lighting system of claim 1, wherein the channel controller is configured to detect a load current of the converter and to identify the low-load state of the lighting system based on the load current being below a current threshold.

4. The lighting system of claim 1, wherein the channel controller is configured to identify the low-load state of the lighting system based on a dimmer level set by an external dimmer.

5. The lighting system of claim 1, wherein, in response to the zero-crossing voltage being above a zero-crossing threshold, the PFC controller is configured to generate the gate control signal to repeatedly turn on and off a driving switch of the converter until the output voltage reaches a desired level, and wherein, in response to the zero-crossing voltage being less than or equal to the zero-crossing threshold, the PFC controller is configured to deactivate the driving switch of the converter to allow the output voltage to drop.

6. The lighting system of claim 5, wherein the zero-crossing delay circuit is configured to prolong an off-time of driving switch in response to the one or more delay control signals from the channel controller.

7. The lighting system of claim 1, wherein the zero-crossing delay circuit comprises:
   a resistor coupled between the output of the converter and the zero-crossing input;
   a first switchable delay circuit switchably coupled between the zero-crossing input and a reference ground, and configured to delay change in the zero-crossing voltage in response to a first delay control signal of the one or more delay control signals.

8. The lighting system of claim 7, wherein the first switchable delay circuit comprises:
   a first capacitor and a first switch coupled together in series between the zero-crossing input and the reference ground.

9. The lighting system of claim 8, wherein the first switch comprises a first gate electrode communicatively coupled to the channel controller, the first switch being configured to activate and capacitively couple the zero-crossing input to the reference ground via the first capacitor in response to receiving the first delay control signal from the channel controller at the first gate electrode, and
   wherein the first switch is configured to deactivate and decouple the zero-crossing input from the first capacitor in an absence of the first delay control signal at the first gate electrode.

10. The lighting system of claim 8, wherein a capacitance of the first capacitor is about 47 µF, a resistance of the resistor is about 50 kΩ.

11. The lighting system of claim 7, wherein the zero-crossing delay circuit further comprises:
    a second switchable delay circuit switchably coupled between the zero-crossing input and a reference ground, and configured to delay change in the zero-crossing voltage in response to a second delay control signal of the one or more delay control signals.

12. The lighting system of claim 11, wherein the second switchable delay circuit comprises:
    a second capacitor and a second switch coupled together in series between the zero-crossing input and the reference ground.

13. The lighting system of claim 12, wherein the second switch comprises a second gate electrode communicatively coupled to the channel controller, the second switch being configured to activate and capacitively couple the zero-crossing input to the reference ground via the second capacitor in response to receiving the second delay control signal from the channel controller at the second gate electrode, and
    wherein the second switch is configured to deactivate and decouple the zero-crossing input from the second capacitor in an absence of the second delay control signal at the second gate electrode.

14. The lighting system of claim 1, further comprising:
    a rectifier configured to receive an AC input signal and to generate the rectified input voltage; and
    a light source configured to emit light based on the output voltage of the converter,
    wherein the converter is a DC-DC converter.

15. A method of reducing power consumption in a lighting system, the method comprising:
    identifying, by a channel controller of the lighting system, that the lighting system is in a low-load state; and
    transmitting, by the channel controller, one or more delay control signals to a zero-crossing delay circuit to capacitively couple a zero-crossing input to the zero-crossing delay circuit,
    wherein the lighting system comprises:
      a converter configured to receive a rectified input voltage and to generate an output voltage based on a gate control signal;
      a PFC controller configured to generate the gate control signal to adjust the output voltage of the converter based on a zero-crossing voltage at the zero-crossing input; and
      the zero-crossing delay circuit that is coupled between an output of the converter and the zero-crossing input, and is configured to slow a rate of change of the zero-crossing voltage based on the one or more delay control signals.

16. The method of claim 15, wherein the channel controller is configured to detect a load current of the converter and to identify the low-load state of the lighting system based on the load current being below a current threshold.

17. The method of claim 15, wherein the channel controller is configured to identify the low-load state of the lighting system based on a dimmer level set by an external dimmer.

18. The method of claim 15, wherein, in response to the zero-crossing voltage being above a zero-crossing threshold, the PFC controller is configured to generate the gate control signal to repeatedly turn on and off a driving switch of the converter until the output voltage reaches a desired level,
    wherein, in response to the zero-crossing voltage being less than or equal to a threshold, the PFC controller is configured to deactivate the driving switch of the converter to allow the output voltage to drop, and
    wherein the zero-crossing delay circuit is configured to prolong an off-time of driving switch in response to the one or more delay control signals from the channel controller.

19. The method of claim 15, wherein the zero-crossing delay circuit comprises:
    a resistor coupled between the output of the converter and the zero-crossing input;
    a first switchable delay circuit switchably coupled between the zero-crossing input and a reference ground, and configured to delay change in the zero-crossing voltage in response to a first delay control signal of the one or more delay control signals.

20. The method of claim 19, wherein the first switchable delay circuit comprises:
    a first capacitor and a first switch coupled together in series between the zero-crossing input and the reference ground,
    wherein the first switch comprises a first gate electrode communicatively coupled to the channel controller, the first switch being configured to activate and capacitively couple the zero-crossing input to the reference ground via the first capacitor in response to receiving the first delay control signal from the channel controller at the first gate electrode, and wherein the first switch is configured to deactivate and decouple the zero-crossing input from the first capacitor in an absence of the first delay control signal at the first gate electrode.

\* \* \* \* \*